United States Patent [19]

Mitsugi

[11] Patent Number: 5,353,023
[45] Date of Patent: Oct. 4, 1994

[54] NAVIGATION SYSTEM FOR CARS

[75] Inventor: Tatsuya Mitsugi, Sanda, Japan

[73] Assignee: Mitsubishi Denki Kabushiki Kaisha, Tokyo, Japan

[21] Appl. No.: 904,026

[22] Filed: Jun. 25, 1992

[30] Foreign Application Priority Data

Jun. 27, 1991 [JP] Japan .................. 3-156721

[51] Int. Cl.$^5$ ............................................. G08G 1/123
[52] U.S. Cl. .................................. 340/989; 340/436; 340/905; 364/424.04
[58] Field of Search ................ 340/988, 989, 990, 991, 340/992, 993, 994, 995, 996, 426, 436, 901, 903, 904, 905; 342/455, 457; 364/424.04, 436.460, 461; 180/274, 282; 379/40, 59

[56] References Cited

U.S. PATENT DOCUMENTS

| | | | |
|---|---|---|---|
| 4,369,426 | 1/1983 | Merkel | 340/436 |
| 4,638,289 | 1/1987 | Zottnik | 340/436 |
| 4,651,157 | 3/1987 | Gray et al. | 340/426 |
| 4,685,061 | 8/1987 | Whitaker | 364/424.04 |
| 4,813,025 | 3/1989 | Rowland et al. | 441/89 |
| 4,904,983 | 2/1990 | Mitchell | 340/539 |
| 4,910,493 | 3/1990 | Chambers et al. | 342/457 |
| 4,992,943 | 2/1991 | McCracken | 364/424.04 |

FOREIGN PATENT DOCUMENTS

| | | | |
|---|---|---|---|
| 2749707 | 5/1979 | Fed. Rep. of Germany | 340/436 |
| 3336092 | 4/1985 | Fed. Rep. of Germany | . |
| 3805810 | 9/1989 | Fed. Rep. of Germany | . |
| 3839959 | 4/1990 | Fed. Rep. of Germany | . |
| 0001829 | 1/1977 | Japan | 340/901 |
| 0100192 | 4/1990 | Japan | 364/424.04 |
| 402263286 | 10/1990 | Japan | 364/424.04 |

OTHER PUBLICATIONS

IEEE Spectrum, Nov. 1986, p. 65 "Inside the Black Box".

Primary Examiner—Brent Swarthout

[57] ABSTRACT

A car navigation system is adapted to be installed on a car for estimating a location of the car, detecting occurrence of an accident, storing information for use in analyzing the accident and performing communication with the outside. The system includes a CD-ROM for storing emergency communication data, a location unit for generating car location data, an accident detecting unit and a FIFO memory in which the above-mentioned data are stored, being updated in the course of time lapse. The system may include a voice recorder for recording voice information generated internally of the car and an ID card unit for storing personal information about a driver and accompanying passengers. A change in an acceleration sensor signal generated by an acceleration sensor is compared with a shock-ascribable acceleration change which is empirically determined and previously stored for detecting occurrence of an accident, upon detection of which information stored in the FIFO memory as well as information stored in the voice recorder and the IC card unit are sent out by a communication unit to the outside. These functions are automatically implemented by a program running on a main CPU.

8 Claims, 20 Drawing Sheets

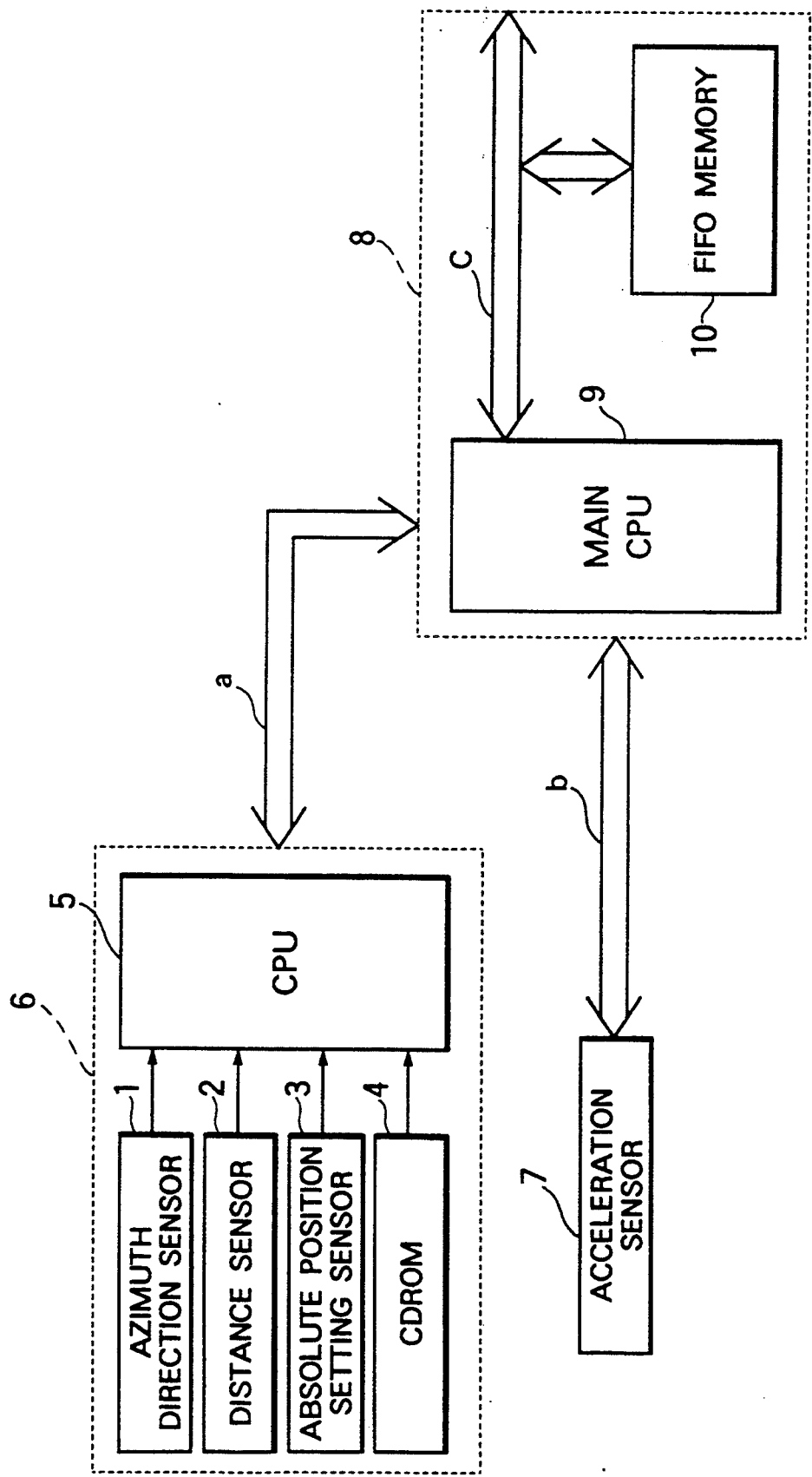

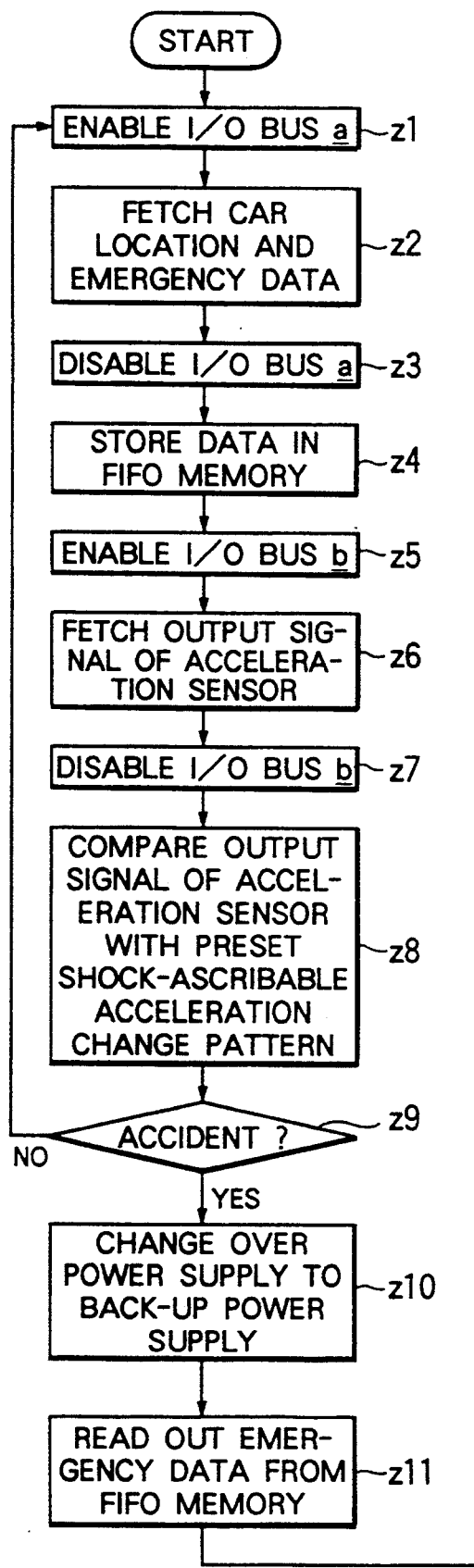
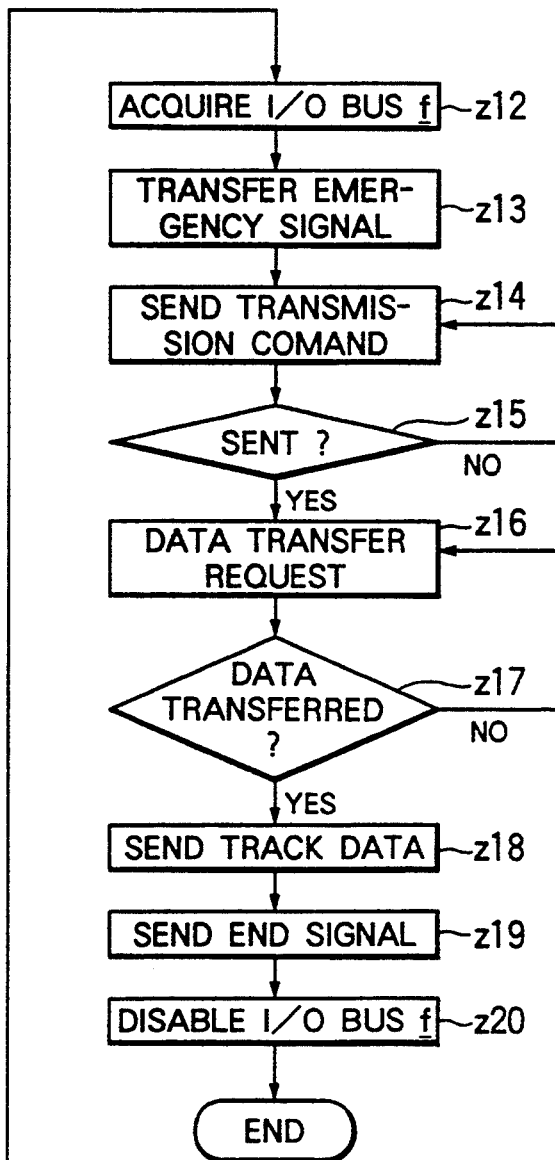
FIG. 17

NAVIGATION SYSTEM FOR CARS

BACKGROUND OF THE INVENTION

The present invention generally relates to a navigation system installed on a car for estimating a location at which the car is currently traveling. More particularly, the invention is concerned with a navigation system which is operatively interlocked with devices or units installed on the same car such as a communication unit exemplified by a transceiver, a device for detecting traveling conditions of the car and others.

The navigation system known heretofore has been designed for only one function of precisely displaying a position or location of a car at which the car equipped with the navigation system is currently traveling, as is disclosed, for example, in Japanese Patent Application Laid-Open No. 266219/1990 (JP-A-H2-266219).

A structure of a known navigation system for a car of the type mentioned above is shown in FIG. 20. As can be seen in this figure, the navigation system is composed of a processor in the form of a CPU 5 having a plurality of inputs supplied with output signals from an azimuth direction sensor 1 operating on the basis of terrestrial magnetism, a distance sensor 2 for detecting a distance covered by the car by measuring the rotation number of a wheel, an absolute position setting sensor 3 in the form of a radio receiver, and a CD-ROM (Compact Disk Read-Only Memory) 4.

In operation of the navigation system shown in FIG. 20, the traveling direction of the car is detected by the azimuth direction sensor 1 while the distance as covered is detected by the distance sensor 2. The absolute position setting sensor 3 receives a signal from a GPS satellite for determining an absolute reference position. The CPU 5 determines the current location of the car on the basis of the output signals from the azimuth direction sensor 1, the distance sensor 2 and the absolute position setting sensor 3 while referring to road network data (road map data) stored in the CD-ROM 4, wherein the location of the car is displayed on a display screen (not shown).

The known navigation system such as described above is designed only for the function of displaying the current traveling position or location of the car, but it is not in the position to detect, record and/or inform to others through radio communication and the like the occurrence of an accident which the car encounters in the course of traveling. Besides, the navigation system is equipped with none of the facilities for storing or recording the track or road history travelled by the car and the traveling or running condition, not to say of the means for recording the intra-car situation (state prevailing within the car) and personal information of the driver and passengers in the car such as names, addresses or the like. Moreover, the known car navigation system is not imparted with the capability of transmitting the information described above to relevant agencies or organizations such as police stations, a JAF (Japanese Automobile Federation Inc.) office or parties concerned. Such being the circumstances, the car involved in an accident is very difficult to locate. Moreover, great difficulty will be encountered in analyzing the cause of the accident. Needless to say, it is impossible or very difficult to inform the accident to liaison offices, organizations concerned such as mentioned above, or the parties concerned such as family or relatives or friends of the driver and/or the accompanying passenger.

Thus, there has long been a need for a system capable of monitoring the location of a car on a road and automatically emitting an accident signal when the car is involved in an accident. In a worst case scenario, if a car accident happened at night at which the event cannot be visually observed, it is vital that a message be sent out substantially immediately and automatically before the situation becomes too serious.

SUMMARY OF THE INVENTION

In the light of the state of the art described above, it is an object of the present invention to provide an improved navigation system for a car which can detect and record an accident involving a car equipped with the navigation system, and which can identify the location of the car.

Another object of the invention is to provide a car navigation system which can provide information for aiding in the analysis of an accident.

A further object of the invention is to provide a car navigation system which incorporates facilities for making it possible to inform outside organizations concerned of an accident immediately after the occurrence thereof so that rescue of the driver and accompanying passengers can be made at the earliest possible stage.

A still further object of the invention is to provide a car navigation system which is capable of recording the traveling conditions of the car, the track or road history travelled by the car, and the situation of the car before the accident has happened.

A further object of the invention is to provide an improved navigation system for a car which stores personal information about the driver and accompanying passengers.

In view of the above and other objects which will be more apparent as description proceeds, there is provided, according to one aspect of the invention, a navigation system comprising: car location estimating means for estimating a location of a traveling car; car accident detecting means for detecting occurrence of an accident on the car; and storage means for storing information available from the car location estimating means and information for use in analyzing the accident, the storage means stopping storing the information when the car accident detecting means detect occurrence of the accident.

According to another aspect of the invention, there is provided a navigation system comprising: car location estimating means for estimating a location of a traveling car; car accident detecting means for detecting occurrence of an accident on the car; and communication means for sending out information obtained from the car location estimating means and information to be used in analyzing the accident to the outside when the car accident detecting means detects occurrence of the accident.

The above and other objects, features and advantages of the invention will become more readily apparent from the following description of preferred embodiments thereof which are shown, by way of example only, in the accompanying drawings.

BRIEF DESCRIPTION OF THE DRAWINGS

FIG. 2 is a block diagram schematically showing the general arrangement of a car navigation system according to a first embodiment of the invention;

FIG. 17 is a flow chart illustrating the operation of the eighth embodiment of FIG. 16;

DESCRIPTION OF THE PREFERRED EMBODIMENTS

Now, the present invention will be described in conjunction with preferred or exemplary embodiments thereof by reference to the accompanying drawings.

Figure 1A:
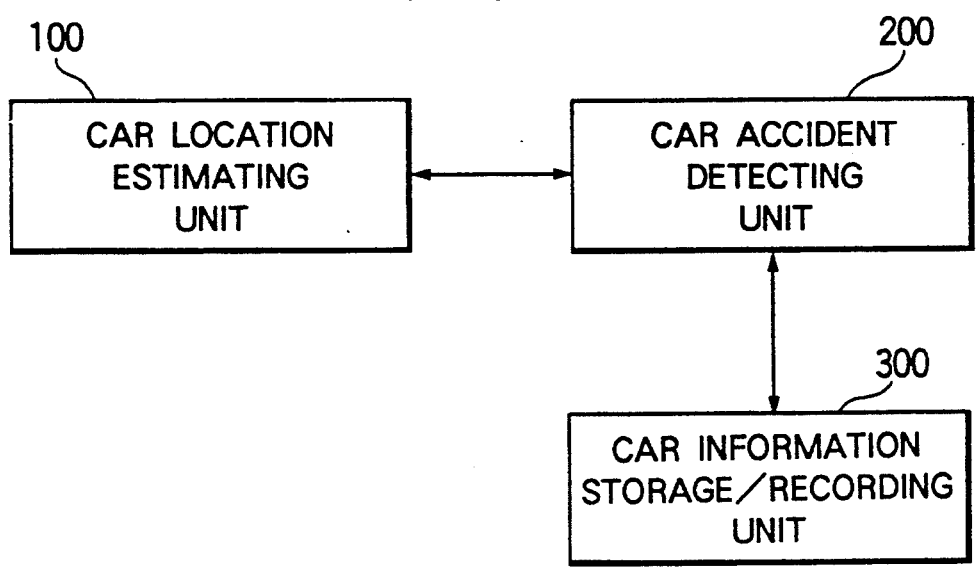
FIGS. 1A and 1B are functional block diagrams for illustrating basic concepts underlying a car navigation system according to the present invention.
Figure 1B:
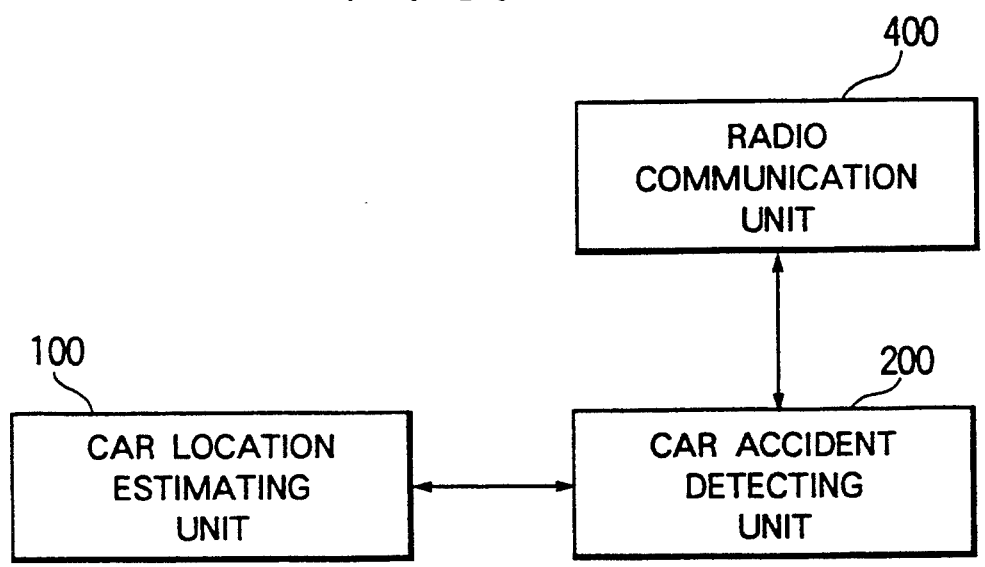

FIGS. 1A and 1B illustrate the basic concepts underlying the invention. Referring first to FIG. 1A, a car navigation system according to a first aspect of the invention includes a car location estimating unit 100 for estimating the current location of a traveling car (i.e., the location or position where the car equipped with the navigation system is currently running or traveling), a car accident detecting unit 200 connected to the car location estimating unit 100 for detecting the occurrence of a car accident, and a car information storage unit 300 connected to the car location estimating unit 200 for storing information about the current car location generated by the car location estimating unit 100 as well as intra-car information such as voices or speech generated within the car and the traveling states or conditions of the car.

FIG. 1B functionally shows the basic construction of a car navigation system according to a second aspect of the invention. In this case, there is provided a radio communication unit 400 which is connected to the car accident detecting unit 200 for sending out car information such as the current car location, voice or speech information, traveling information and the like to the outside to make contact with organizations such as a police station, a traffic control center, a traffic accident dealing agency or the like. Needless to say, a car accident storage unit such as the car information storage unit 300 of FIG. 1A may be connected to the car accident detecting unit 200 of FIG. 1B.

In the following, several embodiments of the invention will be described below.

EMBODIMENT 1

First, description will be directed to a car navigation system according to a first aspect of the present invention, which system is adapted to be installed on a car or motor vehicle or automobile (collectively referred to as the car herein and not restricted to any particular type of car).

FIG. 2 is a block diagram schematically showing the general construction of a car navigation system according to a first embodiment of the invention. Referring to the figure, reference numeral 6 denotes a car location unit which may be of the same structure as that of the conventional unit described hereinbefore with reference to FIG. 20. Accordingly, repeated description of this unit 6 will be unnecessary. A control unit 8 is connected to the car location unit 6 via an I/O (input/output) bus a, wherein an acceleration sensor 7 is connected to the control unit 8 via an I/O bus b.

The control unit 8 includes as major components thereof a main processor in the form of a main CPU (Central Processing Unit) 9 and a FIFO (First-In/First-Out) memory 10 which is connected to the main CPU 9 via a memory bus c.

At this juncture, it should be mentioned that in the above-mentioned first embodiment, the car location unit 6 constitutes the car location estimating means; the acceleration sensor 7 and the main CPU 9 cooperate to constitute the car accident detecting means; and the FIFO memory 10 serves as the car information storage means.

In operation, a CPU 5 of the car location unit 6 estimates the current position or location of the car on which the navigation control system is installed (hereinafter referred to as the current car position or location) on the basis of signals output from an azimuth direction sensor 1, a distance sensor 2 and an absolute position or location setting sensor 3 while consulting road network data (road map data) stored in a compact disk type read-only memory (or CD-ROM in abbreviation) 4, wherein the current car location data is sent out to the control unit 8 via the I/O bus a every time a predetermined time has elapsed or every time the car has travelled a predetermined distance.

On the other hand, the acceleration sensor 7 detects an acceleration of the car in the forward/rearward direction, wherein the acceleration data is also sent to the control unit 8 via the I/O bus b periodically at a predetermined time interval or alternatively at a predetermined travel distance.

At this juncture, it should be added that the main CPU 9 incorporated in the control unit 8 is previously loaded with data of changes in acceleration brought about by shocks which the car receives upon occurrence of accidents. Such data will hereinafter be referred to as the shock-ascribable acceleration change pattern data and are previously determined empirically or experimentally. The main CPU 9 is also loaded with a sub-program for comparing a change in acceleration actually detected by the acceleration sensor 7 with preset shock-ascribable acceleration change patterns.

Next, the operation of the navigation system shown in FIG. 2 will be described below.

Figure 3:
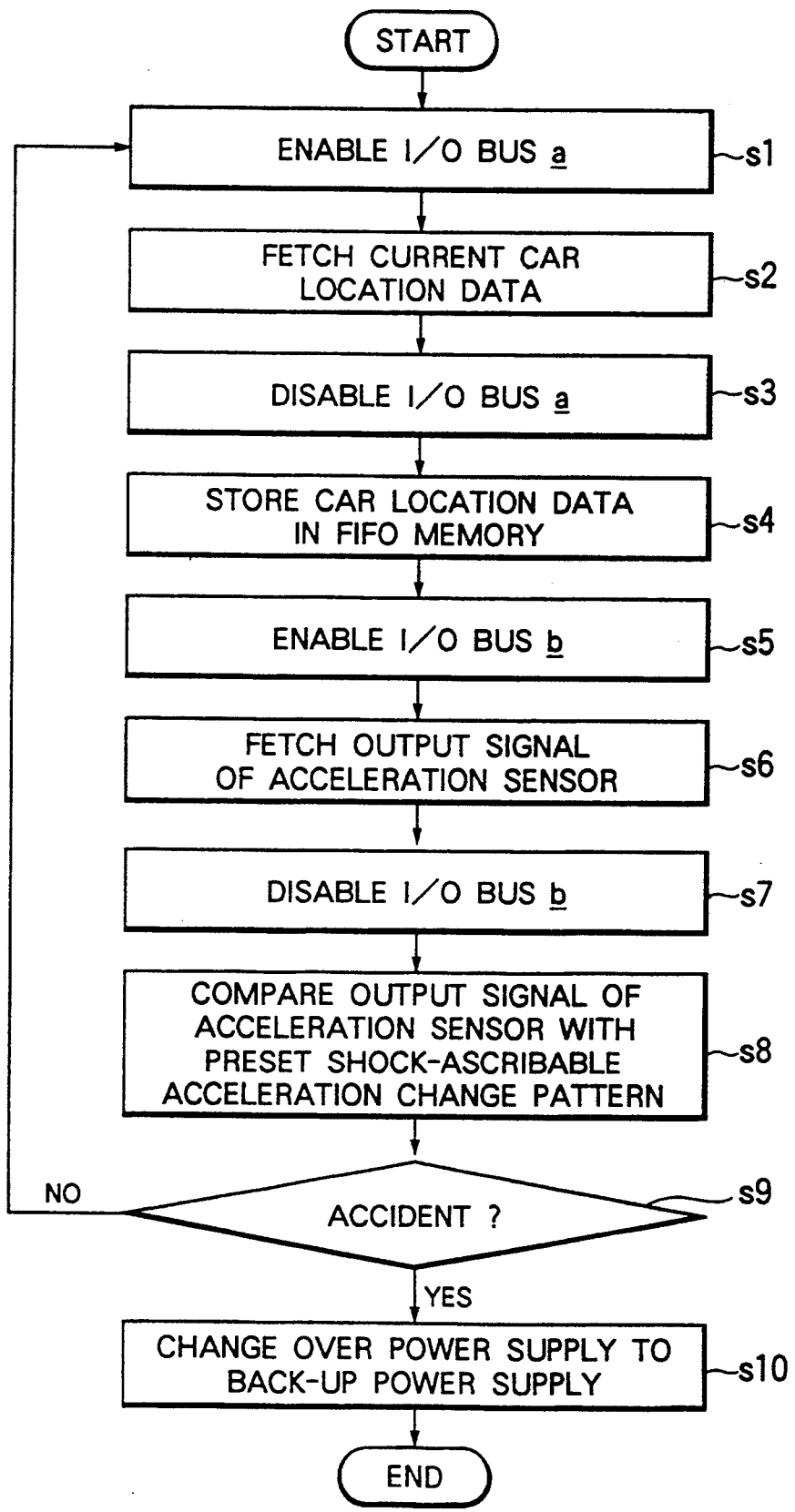
FIG. 3 is a flow chart illustrating the operation of the car navigation system shown in FIG. 1.

FIG. 3 is a flow chart for illustrating a processing sequence which is executed by the main CPU 9 incorporated in the control unit 8.

Referring to FIG. 3, the I/O bus a is opened or enabled in a step s1 which is then followed by step s2 where the current car location or position data is fetched from the car location unit 6. Thereafter, the I/O bus a is disabled or released in a step s3.

In a step s4, the current car position data is loaded in the FIFO memory 10 which thus serves for storing the car location data updated constantly.

In a step s5, the I/O bus b is enabled, and an acceleration signal is fetched from the acceleration sensor 7 in a step s6, whereon the I/O bus b is released in a step s7.

In a step s8, a change in the acceleration sensor signal as fetched is compared with the preset shock-ascribable acceleration change pattern by the main CPU 9.

If the comparison shows that the change in the acceleration sensor signal bears similarity to the preset shock-ascribable acceleration change pattern, it is decided that an accident has actually taken place (i.e., the answer of the decision step s9 is "YES"). In this case, the processing proceeds to a step s10. At that time, the main CPU 9 inhibits input of the current car position data via the I/O bus a upon detection of the occurrence of an accident, thereby preventing the current car position data from being stored any more in the FIFO memory 10.

Now, in the step s10, a memory power supply for the FIFO memory 10 is changed over to a back-up power supply source to allow the car position data to be held or maintained in the FIFO memory 10. The processing operation then comes to an end.

In contrast, if the comparison in the step s9 shows that the change in the acceleration sensor signal has no similarity to the preset shock-ascribable acceleration change pattern, it is then decided that no accident has occurred (i.e., the answer in the decision step s9 is "NO"), and the step s1 is resumed, whereon the execution of the processing steps s1 to s9 is repeated.

As will be understood from the above description, the car position or location data stored in the FIFO memory 10 can be held even after the occurrence of an accident according to the teachings of the invention incarnated in the first embodiment, whereby information about the location of the car, which has been involved in the accident as well as the track or road history travelled by the car until the occurrence of the accident, can be held available even after the accident.

EMBODIMENT 2

A second embodiment of the car navigation system according to the first aspect of the invention will be described.

Figure 4:
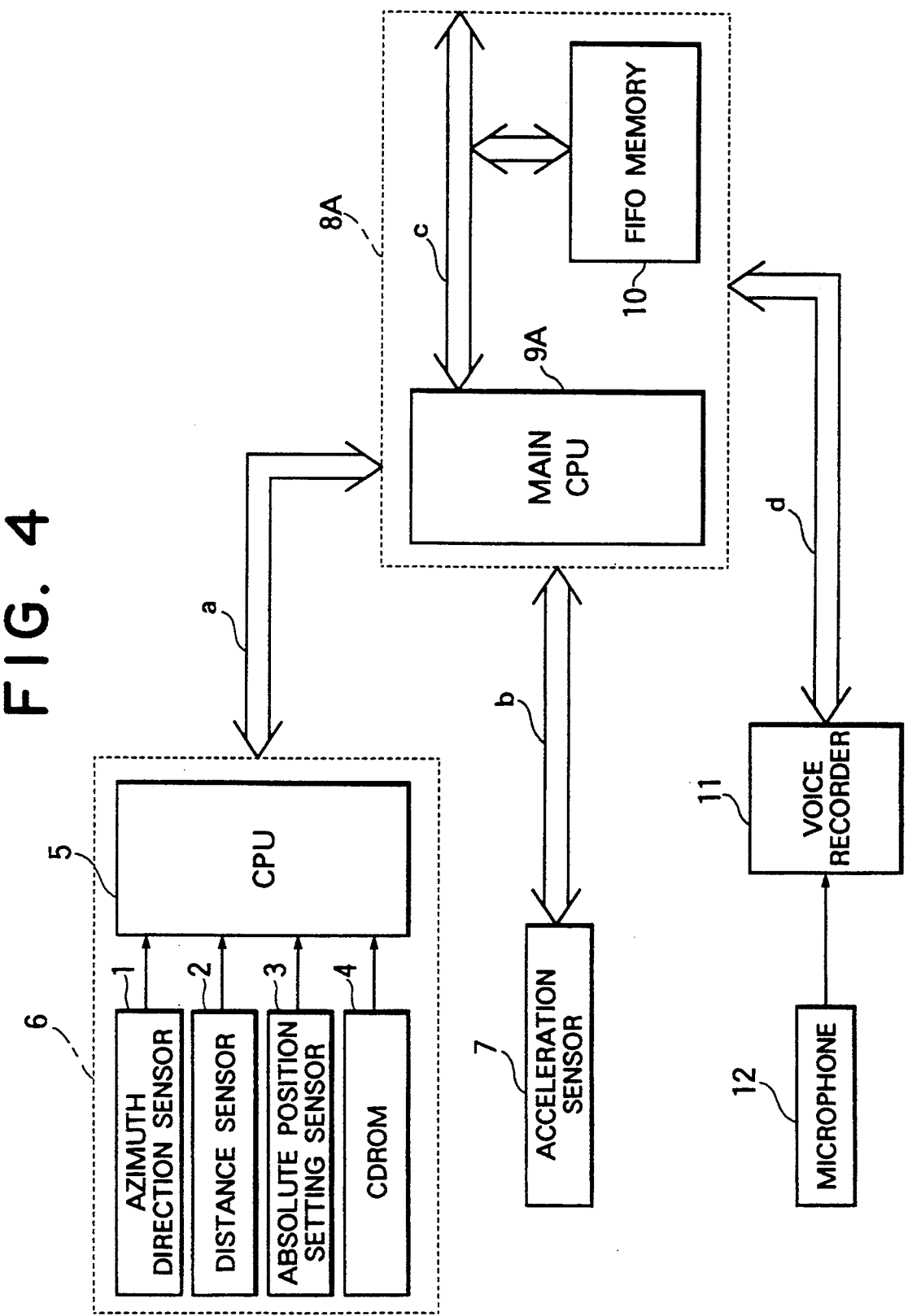
FIG. 4 is a schematic block diagram showing a second embodiment of the invention.
Figure 20:
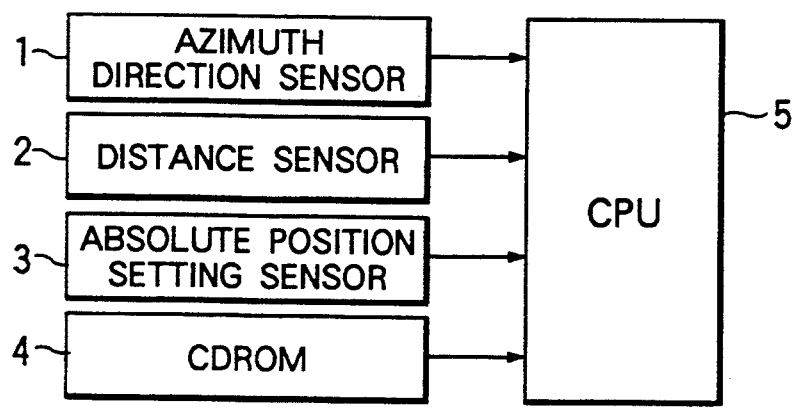
FIG. 20 is a schematic diagram showing a known car navigation system.

FIG. 4 is a schematic block diagram showing the general arrangement of the car navigation system according to the second embodiment of the invention. Referring to the figure, a location unit 6, which may be of the same structure as that of the conventional one described hereinbefore with reference to FIG. 20, is connected via an I/O bus a to a control unit 8A to which a voice recorder 11 and an acceleration sensor 7 of the same structure as that shown in FIG. 2 are connected by way of I/O buses d and b, respectively. The voice recorder 11 may be constituted, for example, by an endless magnetic tape recorder and has a microphone 12 connected thereto.

The control unit 8A includes a main CPU 9A and a FIFO memory 10 connected to the main CPU 9A via a memory bus c. The FIFO memory 10 may be of the same structure and serve for the same function as that shown in FIG. 2.

In the case of the second embodiment of the invention, the location unit 6 constitutes the car location estimating means; the acceleration sensor 7 and the main CPU 9A constitute the car accident detecting means; and the FIFO memory 10 cooperates with the voice recorder 11 and the microphone 12 to constitute the car information storage means of the invention.

Operation of the car navigation system according to the second embodiment will be described with reference to FIG. 4.

As described previously, the CPU 5 of the car location unit 6 estimates the current car location on the basis of the signals output from the azimuth direction sensor 1, the distance sensor 2 and the absolute position setting sensor 8 while consulting the road network data (road map data) stored in the CD-ROM 4, to thereby send out the car location data to the control unit 8A via the I/O bus a periodically at a predetermined time interval or each time the car has travelled a predetermined distance.

The acceleration sensor 7 detects an acceleration of the car in the forward/rearward direction and supplies acceleration data to the control unit 8A via the I/O bus b.

Further, voices or conversations generated in the car are picked up by the microphone 12 and recorded by the voice recorder 11 such as an endless magnetic tape recorder.

The main CPU 9A incorporated in the control unit 8A is previously loaded with the shock-ascribable acceleration change pattern data, as described hereinbefore in conjunction with the first embodiment.

Next, the operation of the car navigation system according to the instant embodiment will be described.

Figure 5:
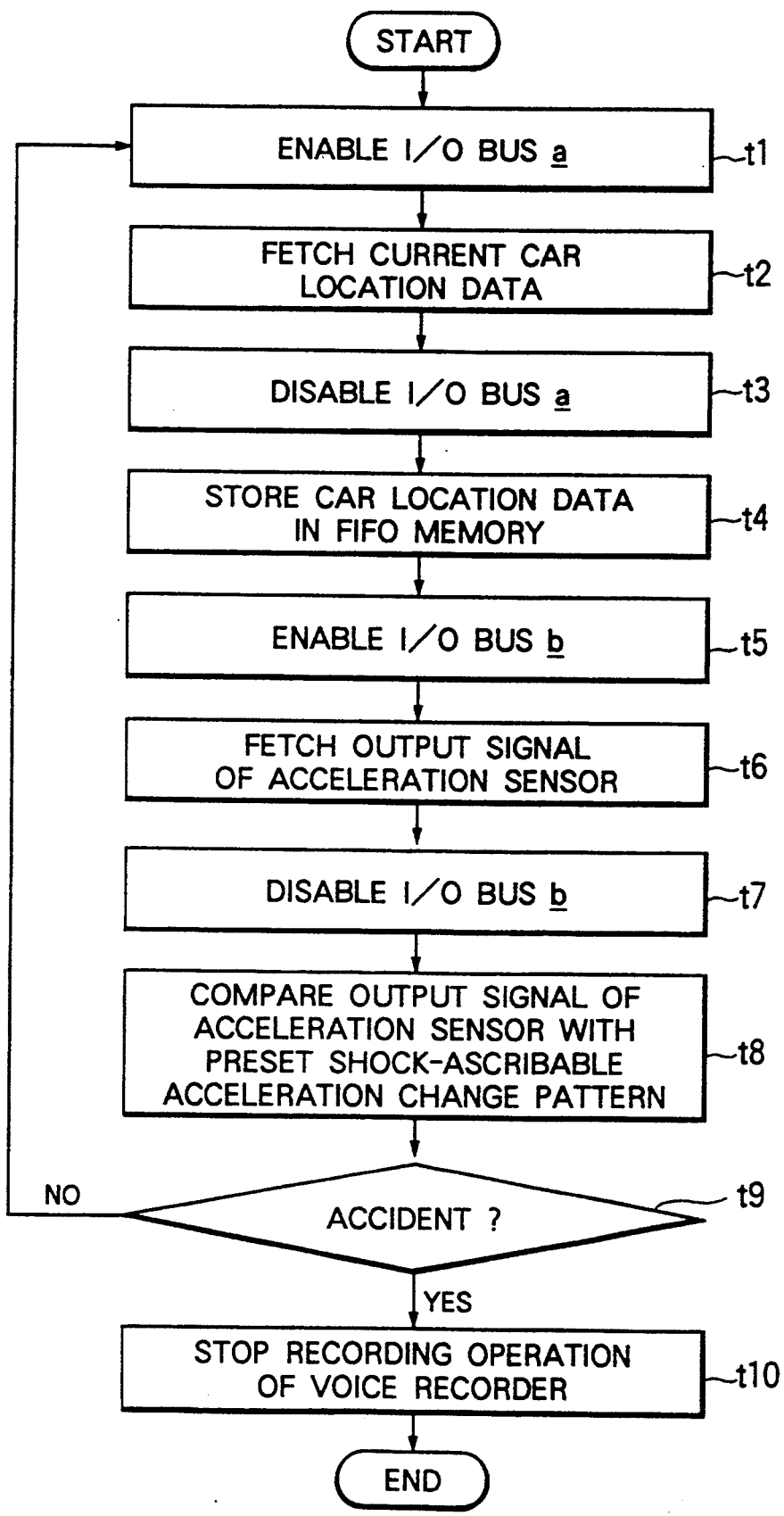
FIG. 5 is a flow chart illustrating the operation of the second embodiment of FIG. 4.

FIG. 5 is a flow chart illustrating a processing sequence executed by the main CPU 9A.

Referring to FIG. 5, the I/O bus a is enabled in a step t1, whereon the control unit 8A fetches car location data from the car location unit 6 in a step t2, which is then followed by a step t3 where the I/O bus a is closed or disabled.

In a step t4 the car location data is loaded in the FIFO memory 10 via the memory bus c. Thus, the FIFO memory 10 successively stores the location data constantly updated.

In a step t5, the I/O bus b is enabled for allowing the main CPU 9A to fetch an acceleration signal from the acceleration sensor 7 in a step t6. Thereafter, the I/O bus b is closed in a step t7.

In a step t8, a change in the acceleration sensor output signal as fetched is compared with the preset shock-ascribable acceleration change pattern data by the main CPU 9A.

If it is determined in step t9 that the change in the acceleration sensor signal is similar to the present shock-ascribable acceleration change pattern, indicating the occurrence of an accident, the processing proceeds to a step t10. When the occurrence of an accident is determined, the main CPU 9A inhibits input of the car location data via the I/O bus a, thereby preventing the car location data from being stored any more in the FIFO memory 10.

In a step t10, the recording operation of the voice recorder 11 is stopped.

In contrast, if it is determined by the main CPU 9A in the step t9 that the change in the acceleration sensor output signal has no similarity to the preset shock-ascribable acceleration change pattern data, indicating no occurrence of an accident (i.e., the answer in the step t9 is "NO"), a return is performed to the step t1, and execution of the processing steps t1 to t9 described above is repeated.

As will be understood from the above description, according to the second embodiment of the invention, it is possible to hold the current car location data stored in the FIFO memory 10 as well as voice data recorded by the voice recorder 11 can be held as they are even after the occurrence of an accident, whereby information about the track followed by the car up to the time of occurrence of the accident as well as the situation within the car can remain available for use in subsequent analysis of the accident.

EMBODIMENT 3

A third embodiment of the car navigation system according to the first aspect of the invention will be described.

Figure 6:
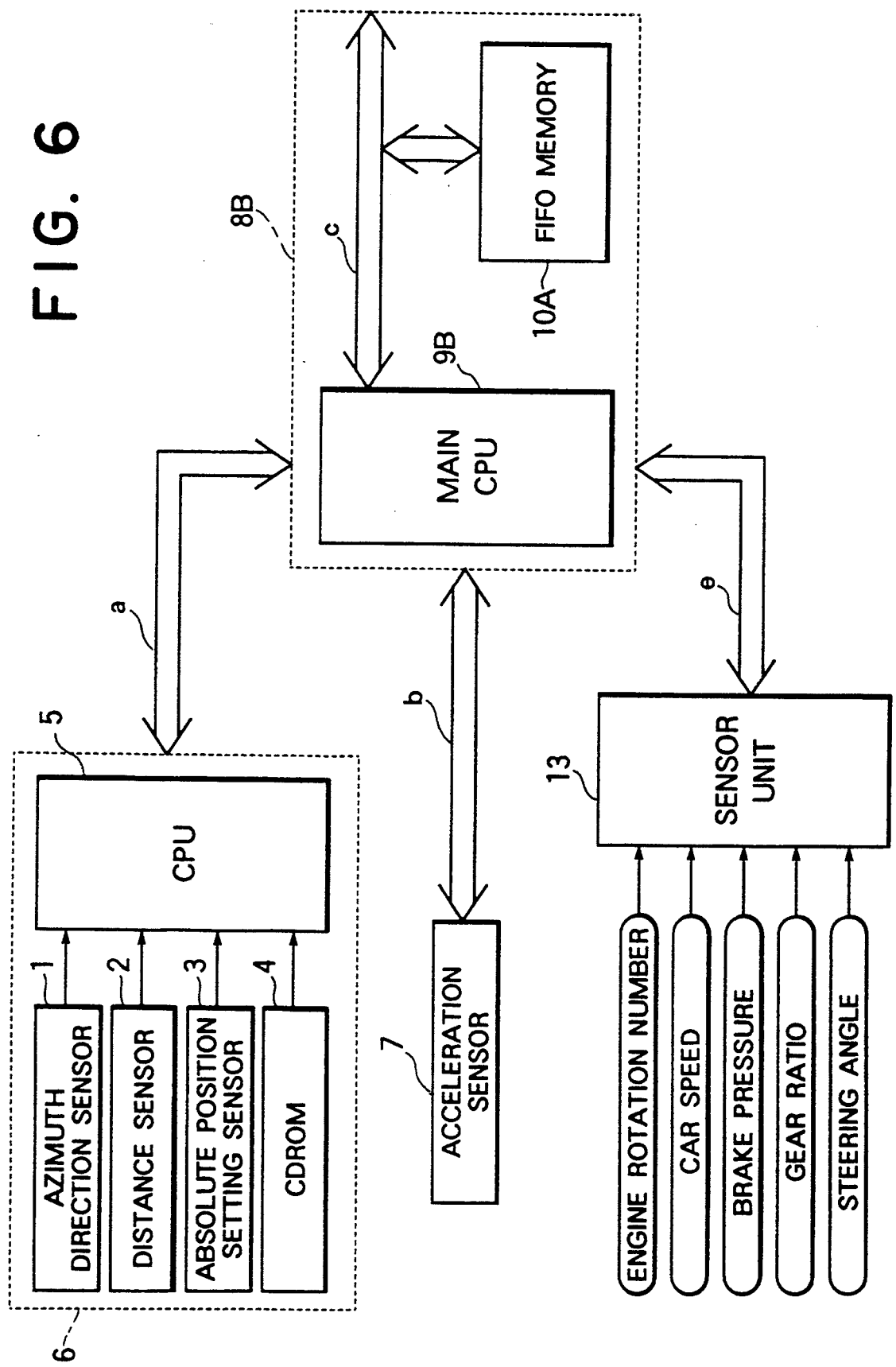
FIG. 6 is a block diagram showing a third embodiment of the invention.

FIG. 6 is a schematic block diagram showing a general configuration of this navigation system. Referring to the figure, a location unit 6, which may be of the same structure and serve for the same function as that of the known system described hereinbefore with reference to FIG. 20, is connected via an I/O bus a to a control unit 8B to which a sensor unit 13 and an acceleration sensor 7, which may be of the same structure as that shown in FIG. 2, are connected by way of I/O buses e and b, respectively.

The control unit 8B includes a main CPU 9B and a FIFO memory 10A connected to the main CPU 9B via a memory bus c.

In the third embodiment of the invention, the location unit 6 constitutes the car location estimating means; the acceleration sensor 7 and the main CPU 9B together constitute the car accident detecting means; and the FIFO memory 10A cooperates with the sensor unit 13 to constitute the car information storage means.

Operation of the navigation system according to the third embodiment will be described with reference to FIG. 6.

As mentioned previously, the CPU 5 of the location unit 6 estimates the current car location on the basis of the signals output from the azimuth direction sensor 1, the distance sensor 2 and the absolute position setting sensor 3 while making reference to road network data (road map data) stored in the CD-ROM 4, to thereby send out the car location data to the control unit 8B via the I/O bus a periodically at a predetermined time interval or each time the car has travelled a predetermined distance.

On the other hand, the acceleration sensor 7 detects an acceleration of the car in the forward/rearward direction, and supplies acceleration data to the control unit 8B via the I/O bus b.

The sensor unit 13 detects the rotational number (i.e., rpm) of an engine, the speed of a car, a brake pressure, a transmission gear ratio and a steering angle, and periodically generates, at a predetermined time interval or at every travel of a predetermined distance, engine rotational number data, car speed data, brake pressure data, transmission gear ratio data and steering angle data, all of which data will hereinafter be referred to as car operation data.

The main CPU 9B incorporated in the control unit 8B is previously loaded with a preset shock-ascribable acceleration change pattern data, as in the case of the preceding embodiments.

Figure 7:
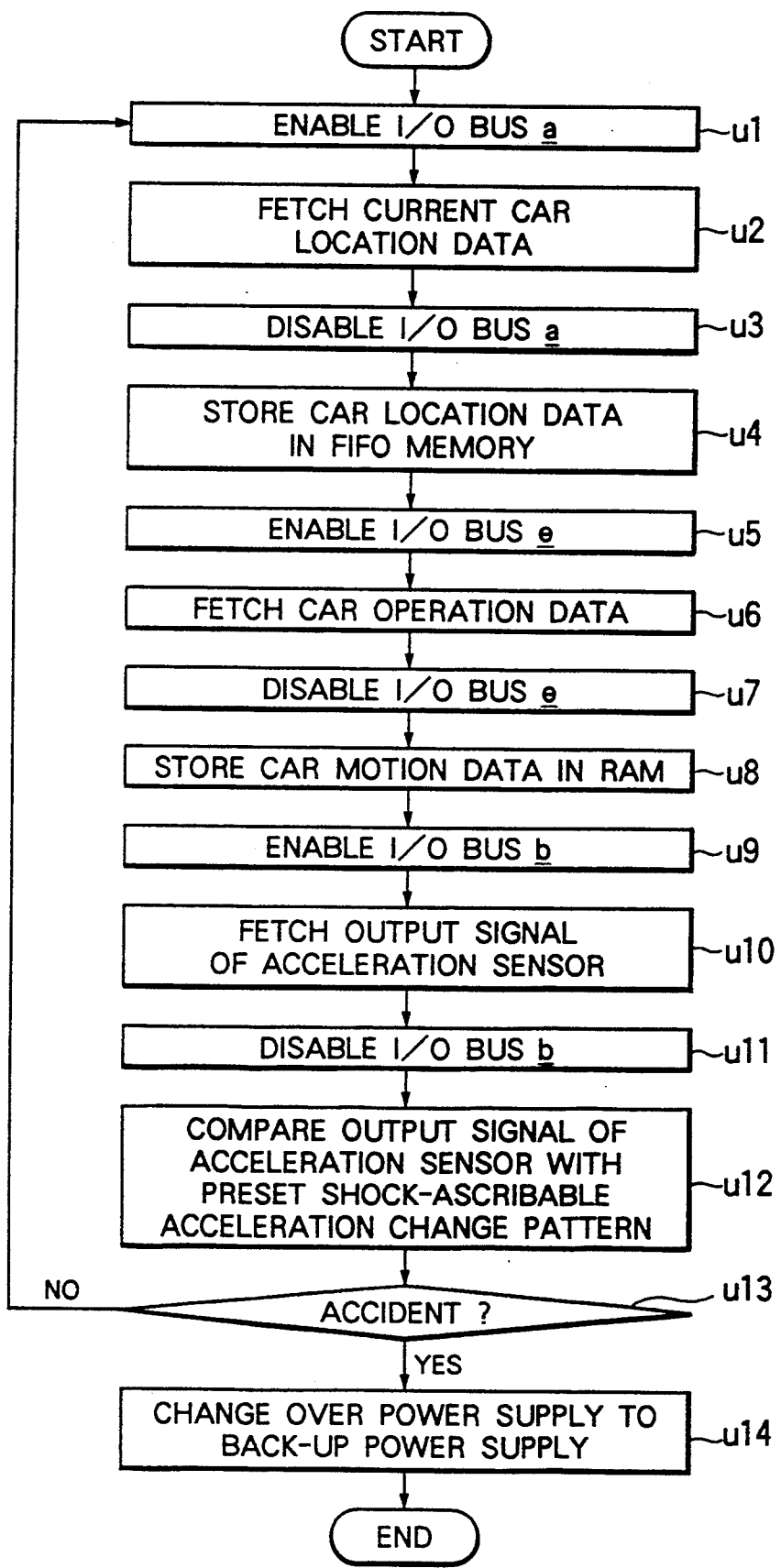
FIG. 7 is a flow chart illustrating the operation of the third embodiment of FIG. 6.

The operation of this embodiment will be describe below while referring to FIG. 7, which illustrates a processing sequence executed by the main CPU 9B.

First, the I/O bus a is enabled in a step u1, whereon the control unit 8B fetches car location data from the car location unit 6 via the I/O bus a in a step u2, which is then followed by a step u3 where the I/O bus a is closed or disabled.

In a step u4, the current car location data is loaded into the FIFO memory 10A via the memory bus c. Thus, the FIFO memory 10A stores the car location data constantly updated.

In a step u5, the I/O bus e is enabled for allowing the control unit 8B to fetch the car operation data from the sensor unit 13 (in a step u6), where the I/O bus e is closed in a step u7.

In a step u8, the car operation data are stored in the FIFO 10A via the memory bus. Thus, the FIFO memory 10A successively stores the car operation data updated latest.

In steps u9 to u11, the I/O bus b is enabled to allow the control unit 8B to fetch an acceleration signal from the acceleration sensor 7, whereon the I/O bus b is disabled.

In a step u12, a change in the acceleration sensor signal is compared with the preset shock-ascribable acceleration change pattern data previously stored in the main CPU 9B.

In a step u13, if it is determined by the CPU 9B that the change in the acceleration sensor signal have similarity to the preset shock-ascribable acceleration change pattern, indicating the occurrence of an accident (i.e., the answer in the step u13 is "YES"), the processing proceeds to a step u14. When the occurrence of an accident is thus detected, the main CPU 9B inhibits transfer of the car location data via the I/O bus a, thereby preventing the car location data from being stored in the FIFO memory 10A any more.

In the step u14, a power supply for the FIFO memory 10A is changed over to a back-up power supply source in order to hold the car location data as well as the car operation data stored in the FIFO memory 10A for use in subsequent analysis.

On the contrary, if it is determined in the step u13 that the change in the acceleration sensor signal has no similarity to the preset shock-ascribable acceleration change pattern, indicating no occurrence of an accident, a return is performed to the step u1, where execution of the processing steps u1 to u13 described above is repeated.

As will be understood from the above description, according to the third embodiment of the invention, it is possible to hold the current car location data and the car operation data stored in the FIFO memory 10A as they are even after the occurrence of an accident, whereby information about the track followed by the car up to the time of occurrence of the accident as well as the traveling data of the car can be maintained available for use in subsequent analysis of the car accident.

EMBODIMENT 4

A fourth embodiment of the car navigation system according to a second aspect of the present invention will next be described.

Figure 8:
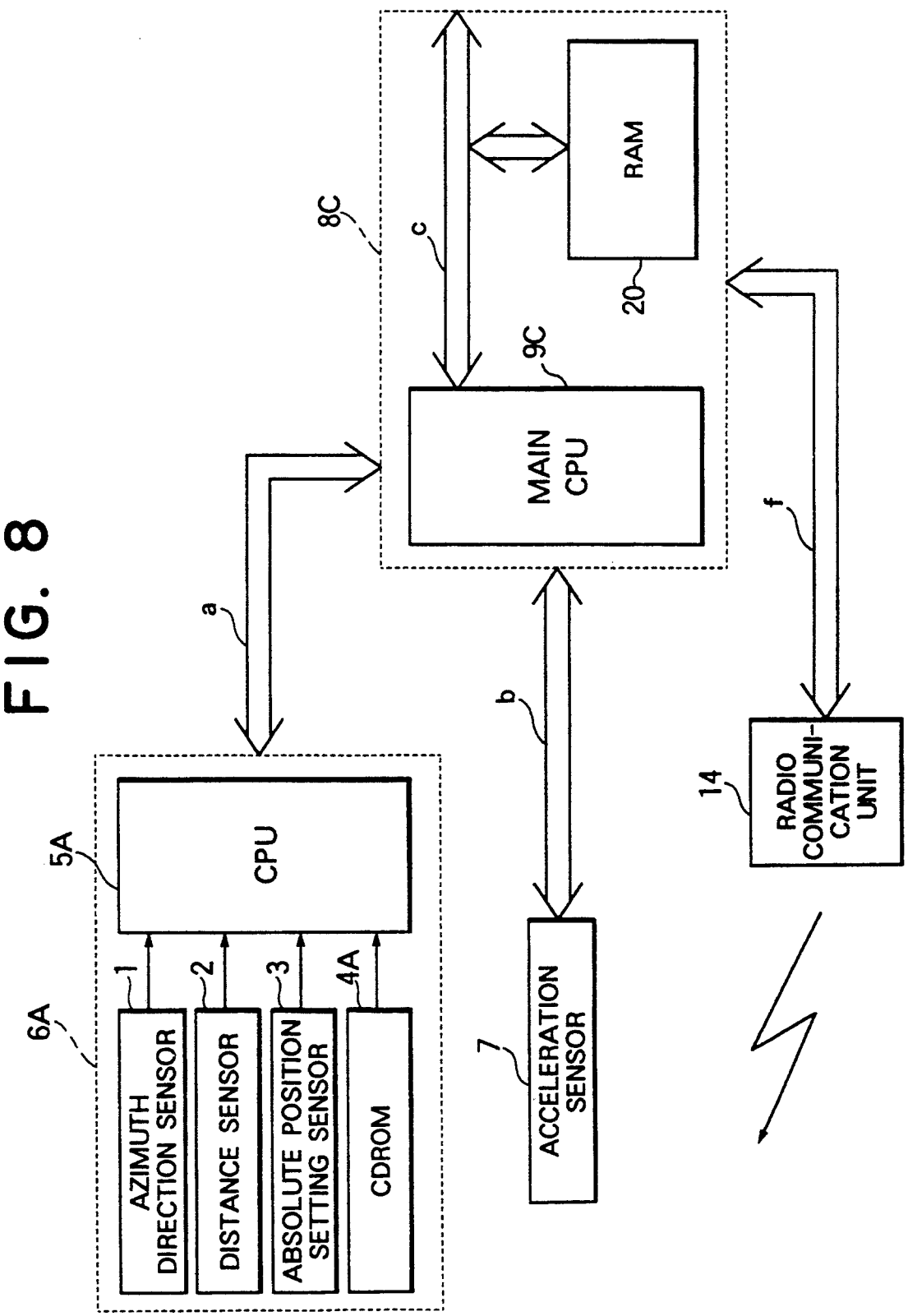
FIG. 8 is a block diagram showing a fourth embodiment of the invention.

FIG. 8 is a schematic block diagram showing a general arrangement of the navigation system according to the instant embodiment. Referring to the figure, a location unit 6A, which may be of the same structure and function as those of the conventional one described hereinbefore, is connected via an I/O bus a to a control unit 8C to which a radio communication unit 14 and an acceleration sensor 7 of the same structure as that shown in FIG. 2 are connected by way of I/O buses f and b, respectively. The radio communication unit 14 is composed of a transmitter, a receiver, an antenna and an automatic sender circuit which may be incorporated in a car telephone set.

The location unit 6A includes an azimuth sensor 1, a distance sensor 2, an absolute position setting sensor 3, a CD-ROM 4A, and a CPU 5A having a plurality of inputs connected to the outputs of the sensors 1, 2 and 3 and the CD-ROM 4A, respectively. The control unit 8C includes a main CPU 9C and a RAM 20 connected to the main CPU 9C via a memory bus c.

In the fourth embodiment of the invention, the location unit 6A constitutes the car location estimating means; the acceleration sensor 7, the main CPU 9C and the RAM 20 together constitute the car accident detecting means; and the radio communication unit 14 constitutes the communication means.

The operation of the fourth embodiment will be described with reference to FIG. 8.

As described previously, the CPU 5A of the location unit 6A estimates the current car location on the basis of the signals output from the azimuth direction sensor 1, the distance sensor 2 and the absolute position setting sensor 3 while consulting road network data (road map data) stored in the CD-ROM 4, to thereby transfer the current car location data to the control unit 8C via the I/O bus a periodically at a predetermined time interval or each time the car has travelled a predetermined distance. The CD-ROM 4A additionally stores data for emergency communication such as telephone numbers of traffic control organizations such as those of a police station, a branch office of the JAF (Japanese Automobile Federation Incorporated) and the like. The CPU 5A reads out the emergency message data from the CD-ROM 4A and transfers it to the control unit 8C periodically at a predetermined time interval or each time the car has travelled a predetermined distance, as in the case of the car location data.

On the other hand, the acceleration sensor 7 detects an acceleration of the car in the forward/rearward direction, and supplies acceleration data to the control unit 8C via the I/O bus b periodically at a predetermined time interval or each time the car has travelled a predetermined distance.

The main CPU 9 incorporated in the control unit 8C is previously loaded with the preset shock-ascribable acceleration change pattern data, as in the case of the preceding embodiments.

Figure 9:
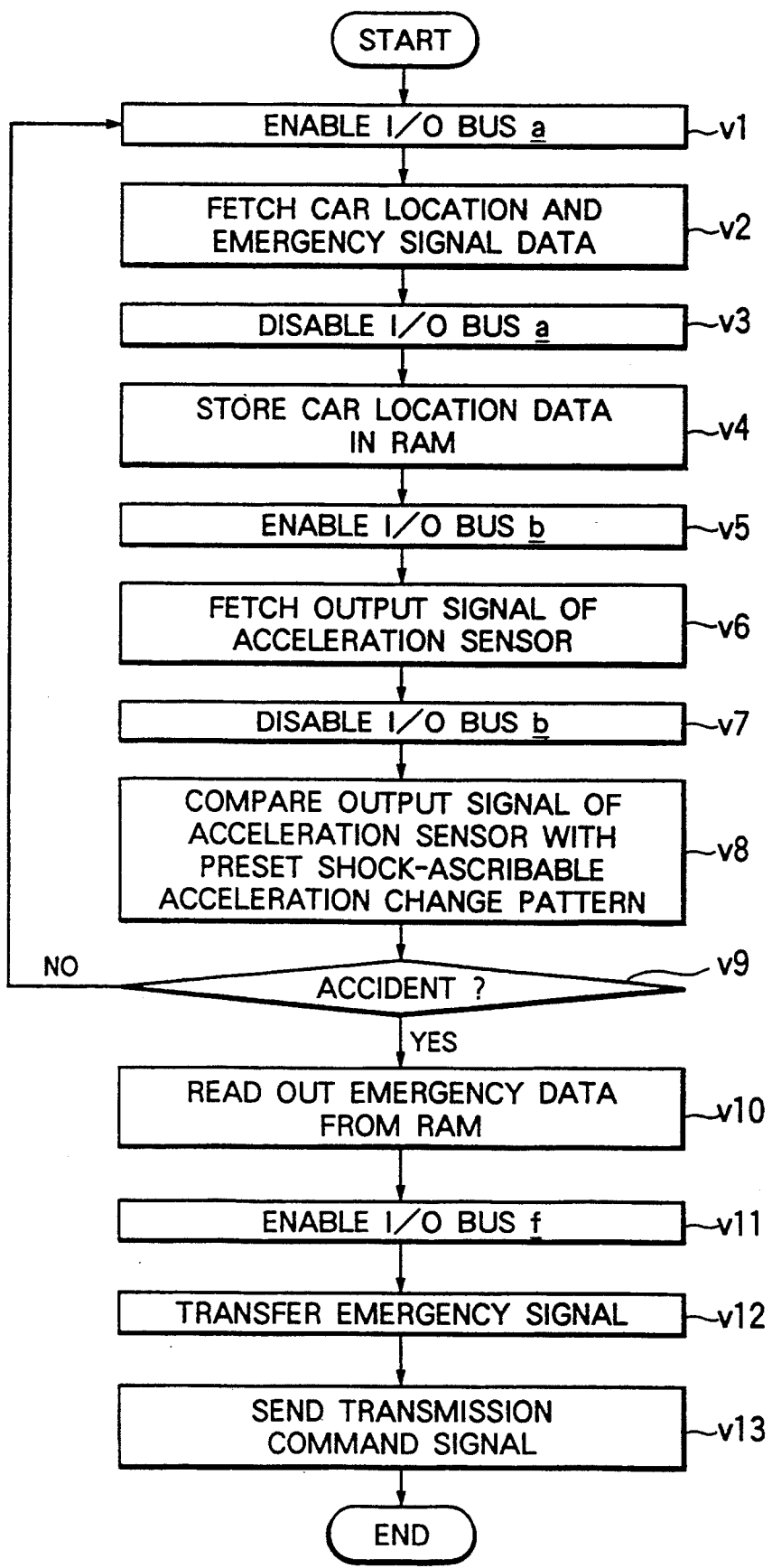
FIG. 9 is a flow chart illustrating the operation of the fourth embodiment of FIG. 8.

The operation of this embodiment will be described below with reference to FIG. 9, which illustrates a processing sequence executed by the main CPU 9C of the control unit 8C.

First, the I/O bus a is enabled in a step v1, whereon the control unit 8C fetches the current car location data from the location unit 6A in a step v2, which is then followed by a step v3 where the I/O bus a is released.

In a step v4, the current car location data and the emergency communication data are loaded in the RAM 20 of the control unit 8C via the memory bus c. Thus, the RAM 20 stores the car location data continuously updated and the emergency communication data.

In a step v5, the I/O bus b is enabled for allowing the control unit 8C to fetch an acceleration signal from the acceleration sensor 7 in a step v6. Thereafter, the I/O bus b is disabled in a step v7.

In a step v8, a change in the acceleration sensor signal is compared by the main CPU 9C with the preset shock-ascribable acceleration change pattern previously stored in the main CPU 9C.

In a step v9, if it is determined that the change in the acceleration sensor signal is similar to the preset shock-ascribable acceleration change pattern, indicating the occurrence of an accident, the processing proceeds to a step v10 where the main CPU 9C inhibits transfer of the car location data and the emergency communication data to the control unit 8C via the I/O bus a, thereby preventing the car location data from being stored in the RAM 20.

In a step v10, the emergency communication data is read out from the RAM 20 immediately before the data in the RAM 20 disappears or is erased.

In steps v11 to v13, the emergency communication data as read out is sent to the radio communication unit 14 via the I/O bus f together with a transmission command signal. In response, the radio communication unit 14 automatically sends out an emergency message or information to a police station or a JAF office which has jurisdiction over the district where the accident has occurred.

In contrast, if it is determined in the step v9 that the change in the acceleration sensor signal has no similarity to the preset shock-ascribable acceleration change pattern, indicating no accident, a return is performed to the step v1, whereon execution of the processing steps v1 to v9 described above is repeated.

As will be understood from the above description, according to the fourth embodiment of the invention, it is possible to inform the police station or JAF office of the occurrence of an accident by sending out the updated data of the car location and the emergency communication data stored in the RAM 20.

EMBODIMENT 5

A fifth embodiment of the car navigation system according to a second aspect of the invention will be described.

Figure 10:
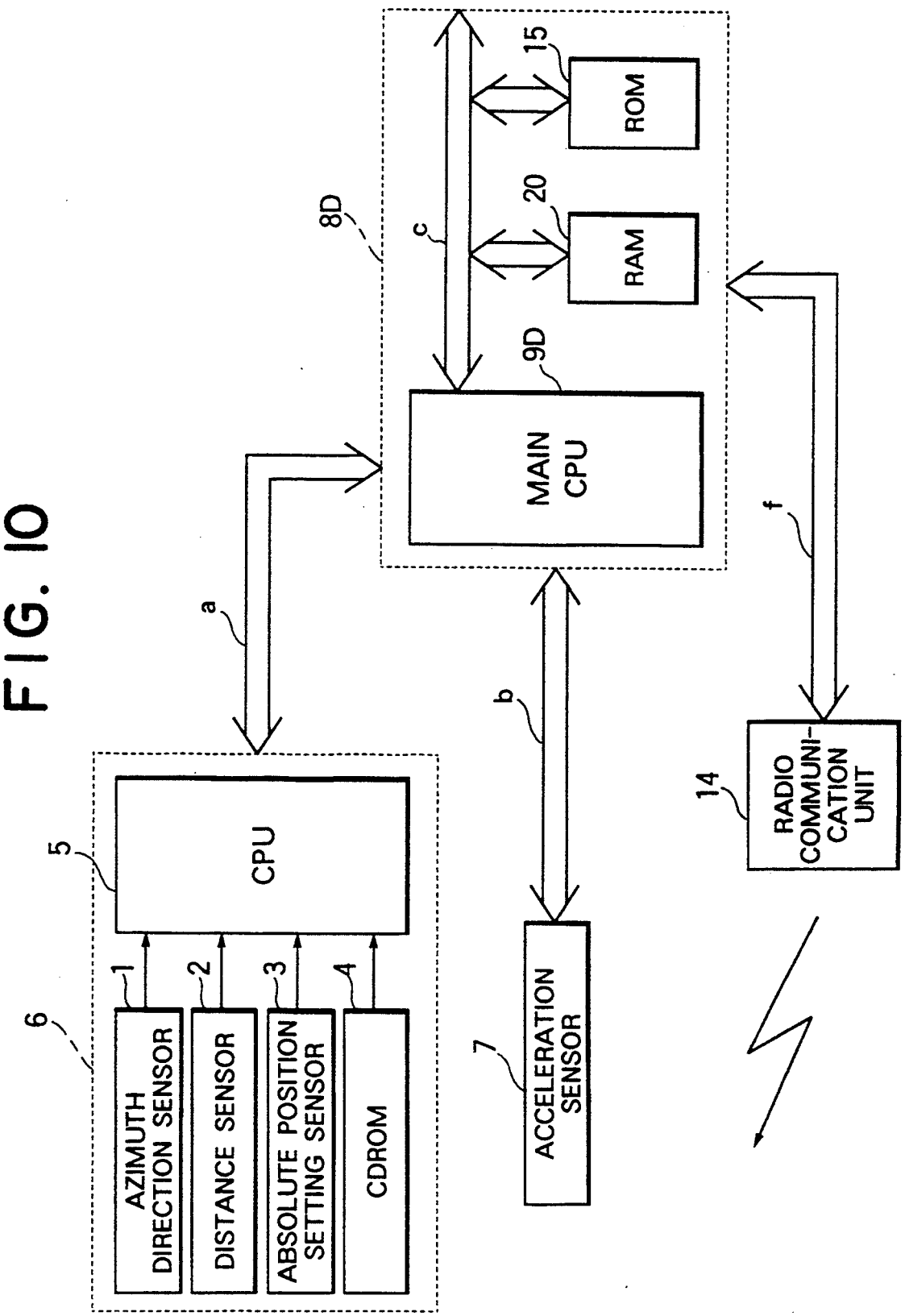
FIG. 10 is a block diagram showing a fifth embodiment of the invention.

FIG. 10 is a block diagram showing the general arrangement of the navigation system according to the instant embodiment. Referring to the figure, a location unit 6, which may be the same as the conventional one, is connected via an I/O bus a to a control unit 8D to which a radio communication unit 14 and an acceleration sensor 7 of the same structure as that shown in FIG. 2 are connected by way of I/O buses f and b, respectively. The radio communication unit 14 may be of the same types as that described above in conjunction with the fourth embodiment.

The control unit 8D includes a main CPU 9D, a RAM 20 serving for the same function as the RAM 20 shown in FIG. 8, and a ROM 15, these memories being connected to the main CPU 9D via a memory bus c.

In the fifth embodiment of the invention, the location unit 6 constitutes the car location estimating means; the acceleration sensor 7, the main CPU 9D, the RAM 20 and the ROM 15 together constitute the car accident detecting means; and the radio communication unit 14 constitutes the communication means of the invention.

The operation of the fifth embodiment will be described with reference to FIG. 10.

As described previously, the CPU 5 of the location unit 6 estimates the current car location on the basis of the signals output from the azimuth direction sensor 1, the distance sensor 2 and the absolute position setting sensor 3 while consulting road network data (road map data) stored in the CD-ROM 4, to thereby transfer the current car location data to the control unit 8D via the I/O bus a periodically at a predetermined time interval or each time the car has travelled a predetermined distance.

On the other hand, the acceleration sensor 7 detects an acceleration of the car in the forward or rearward direction, and supplies the acceleration data to the control unit 8D via the I/O bus b.

The main CPU 9D incorporated in the control unit 8D is previously loaded with the preset shock-ascribable acceleration change pattern data, as described previously, while the ROM 15 stores emergency communication data such as telephone numbers of police stations, JAF or others organizations concerned.

Figure 11:
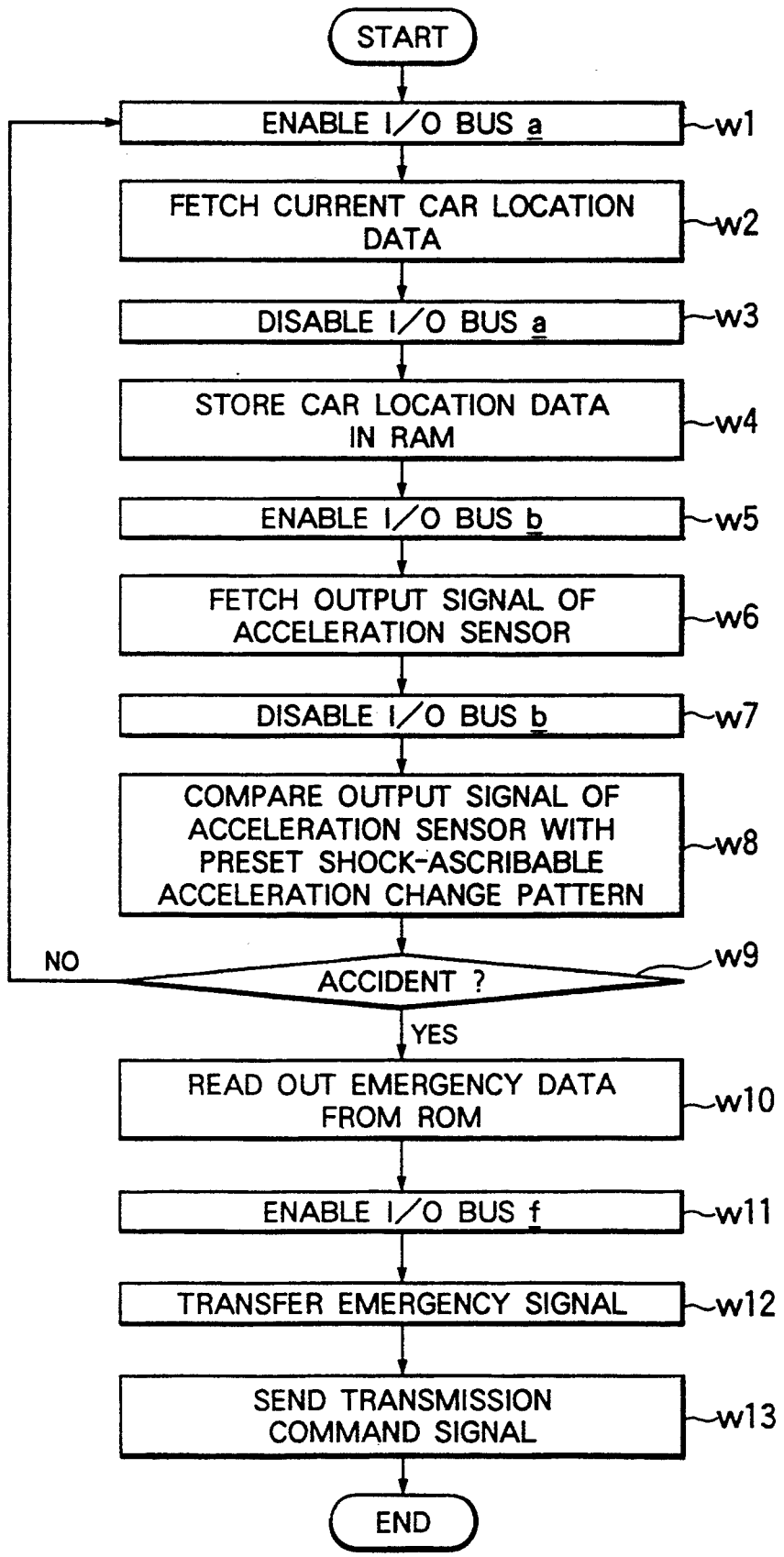
FIG. 11 is a flow chart illustrating the operation of the fifth embodiment of FIG. 10.

Next, the operation of the this embodiment will be described while referring to FIG. 11, which illustrates a processing sequence executed by the main CPU 9D of the control unit 8D.

First, the I/O bus a is enabled in a step w1, whereon the control unit 8D fetches car location data from the car location unit 6 in a step w2, which is then followed by a step w3 where the I/O bus a is disabled.

In a step w4, emergency communication data is read out from the ROM 15 on the basis of the car location data, whereon the car location data and the emergency communication data are transferred to the RAM 20 via the memory bus c. In this way, the car location data and the emergency communication data stored in the RAM 20 are updated continuously.

In a step w5, the I/O bus b is reserved for allowing the control unit 8D to fetch an acceleration signal from the acceleration sensor 7 in a step w6. Thereafter, the I/O bus b is disabled in a step w7.

In a step w8, a change in the acceleration sensor signal is compared with the preset shock-ascribable acceleration change pattern previously stored in the main CPU 9D.

In a step w9, if it is determined that the change in the acceleration sensor signal is similar to the preset shock-ascribable acceleration change pattern, indicating the occurrence of an accident, the processing proceeds to a step w10 where the main CPU 9D inhibits transfer of the car location data via the I/O bus a, thereby preventing the car location data stored in the RAM 20 from being updated.

In a step w10, the emergency communication data is read out from the RAM 20 immediately before the data in the RAM 20 disappears or is erased.

In steps w11 to w13, the I/O bus f is reserved for transferring the emergency communication data as read out to the radio communication unit 14 via the I/O bus f along with a transmission command signal. In response, the radio communication unit 14 automatically sends out an emergency message or information to the police or JAF station having jurisdiction over the district in which the car suffering from the accident is located.

On the contrary, if it is determined in the step w9 that the change in the acceleration sensor signal has no similarity to the preset shock-ascribable acceleration change pattern, indicating no occurrence of an accident, a return is performed to the step w1, whereon execution of the processing steps w1 to w9 described above is repeated.

As will be understood from the above description, according to the fifth embodiment of the invention, it is possible to inform the police station or JAF office or other organizations of the occurrence of an accident by using the updated car location data and emergency communication data stored in the RAM 20.

EMBODIMENT 6

A sixth embodiment of the car navigation system according to a second aspect of the invention will next be described.

Figure 12:
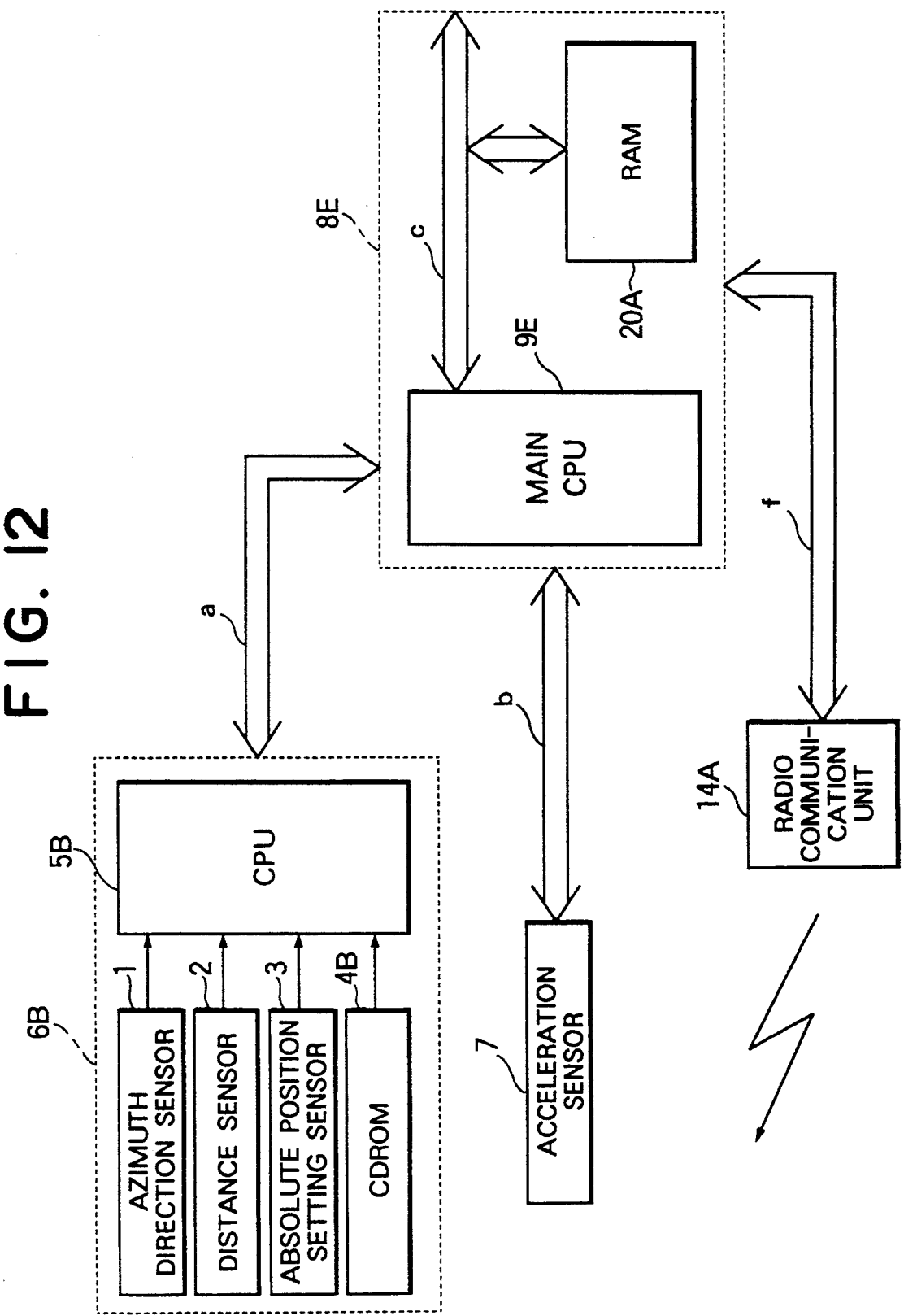
FIG. 12 is a block diagram showing a sixth embodiment of the invention.

FIG. 12 is a block diagram showing the general arrangement of a navigation system according to the instant embodiment. Referring to the figure, a location unit 6B, which may be of the same structure as that of the conventional one described hereinbefore, is connected via an I/O bus a to a control unit 8E to which an acceleration sensor 7 of the same structure as that of the first embodiment and a radio communication unit 14A are connected by way of I/O buses b and f, respectively. The radio communication unit 14A may be constituted by a wireless transceiver type unit which includes a transmitter, a receiver and an automatic sender.

The location unit 8B includes an azimuth direction sensor 1, a distance sensor 2, an absolute position setting sensor 3 and a CD-ROM 4B and a CPU 5B connected to the outputs of the azimuth direction sensor 1, the distance sensor 2, the absolute position setting sensor 3 and the CD-ROM 4B, respectively.

The control unit 8E includes a main CPU 9E and a RAM 20A connected to the main CPU 9E via a memory bus c.

In the sixth embodiment of the invention, the location unit 6B constitutes the car location estimating means; the acceleration sensor 7, the main CPU 9E and the RAM 20A together constitute the car accident detecting means; and the transceiver unit 14A constitutes the communication means of the invention.

The operation of the instant embodiment will be described with reference to FIG. 12.

The CPU 5B of the location unit 6B estimates the current car location on the basis of the signals output from the azimuth direction sensor 1, the distance sensor 2 and the absolute position setting sensor 3 while consulting road network data (road map data) stored in the CD-ROM 4B, to thereby transfer the estimated current car location data to the control unit 8E via the I/O bus a periodically at a predetermined time interval or each time the car has travelled a predetermined distance. The CD-ROM 4B also stores an emergency frequency data representing an emergency message as an SOS signal or the like.

The acceleration sensor 7 detects an acceleration of the car in the forward or rearward direction, and supplies the acceleration data to the control unit 8E via the I/O bus b periodically at a predetermined time interval or each time the car has travelled a predetermined distance.

The main CPU 9E incorporated in the control unit 8E is previously loaded with a preset shock-ascribable acceleration change pattern data, as described hereinbefore in the preceding embodiments.

Next, the operation of the car navigation system according to this embodiment will be described while referring to FIG. 13, which illustrates a processing sequence executed by the main CPU 9E of the control unit 8E.

Figure 13:
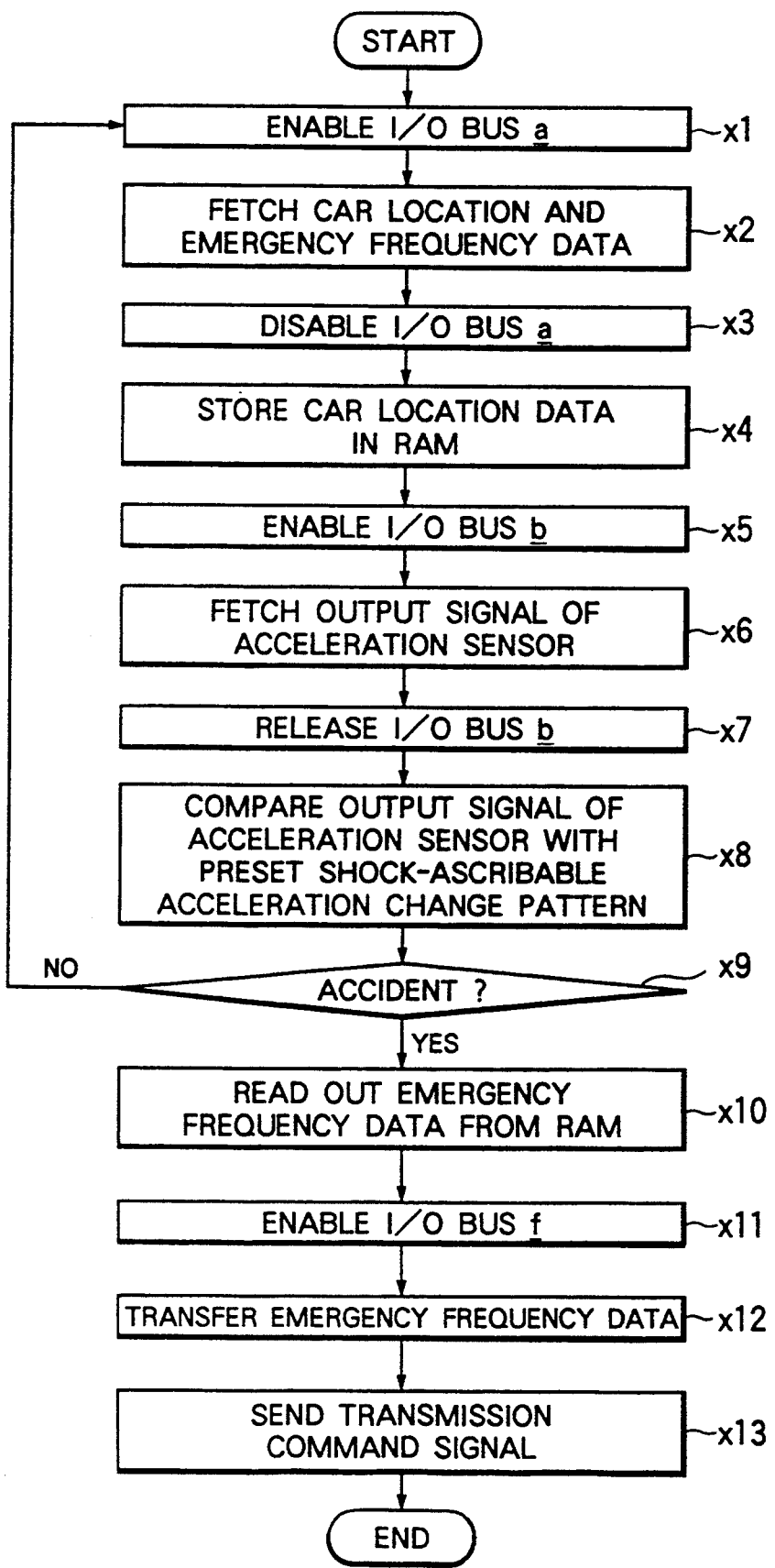
FIG. 13 is a flow chart illustrating the operation of the sixth embodiment of FIG. 12.

Referring to FIG. 13, the I/O bus a is enabled in a step x1, whereon the control unit 8E fetches car location data from the location unit 6B in a step x2, which is then followed by a step x3 where the I/O bus a is disabled.

In a step x4, the car location data and the emergency frequency data are loaded in the RAM 20A via the memory bus c, so that the car location data and the emergency frequency data stored in the RAM 20A are updated correspondingly.

In a step x5, the I/O bus b is enabled for allowing the control unit 8E to fetch an acceleration signal from the acceleration sensor 7 in a step x6. Thereafter, the I/O bus b is disabled in a step x7.

In a step x8, a change in the acceleration sensor signal as fetched is compared by the CPU 9E with the preset shock-ascribable acceleration change pattern.

In a step x9, if it is determined that the change in the acceleration sensor signal is similar to the preset shock-ascribable acceleration change pattern, indicating the occurrence of an accident, the processing proceeds to a step x10 where the main CPU 9E inhibits any further transfer of the car location data and the emergency frequency data via the I/O bus a to thereby prevent the car location data stored in the RAM 20A from being updated.

In a step x10, the emergency frequency data is read out from the RAM 20A immediately before the data in the RAM 20A disappear.

In steps x11 to x13, the emergency frequency data as read out is sent out to the radio communication unit 14A via the I/O bus f together with a transmission command signal. In response, the radio communication unit 14A automatically sends out the emergency signal such as an SOS signal.

In contrast, if it is determined in the step x9 that the change in the acceleration sensor signal has no similarity to the preset shock-ascribable acceleration change pattern, indicating no accident, the step x1 is resumed.

As will be understood from the above description, according to the sixth embodiment of the invention, it is possible to inform the occurrence of an accident to a monitoring station or a third party by sending out the latest car location data and the emergency frequency data stored in the RAM 20A at the time when the accident has taken place.

EMBODIMENT 7

A seventh embodiment of the car navigation system according to a second aspect of the invention will be described.

Figure 14:
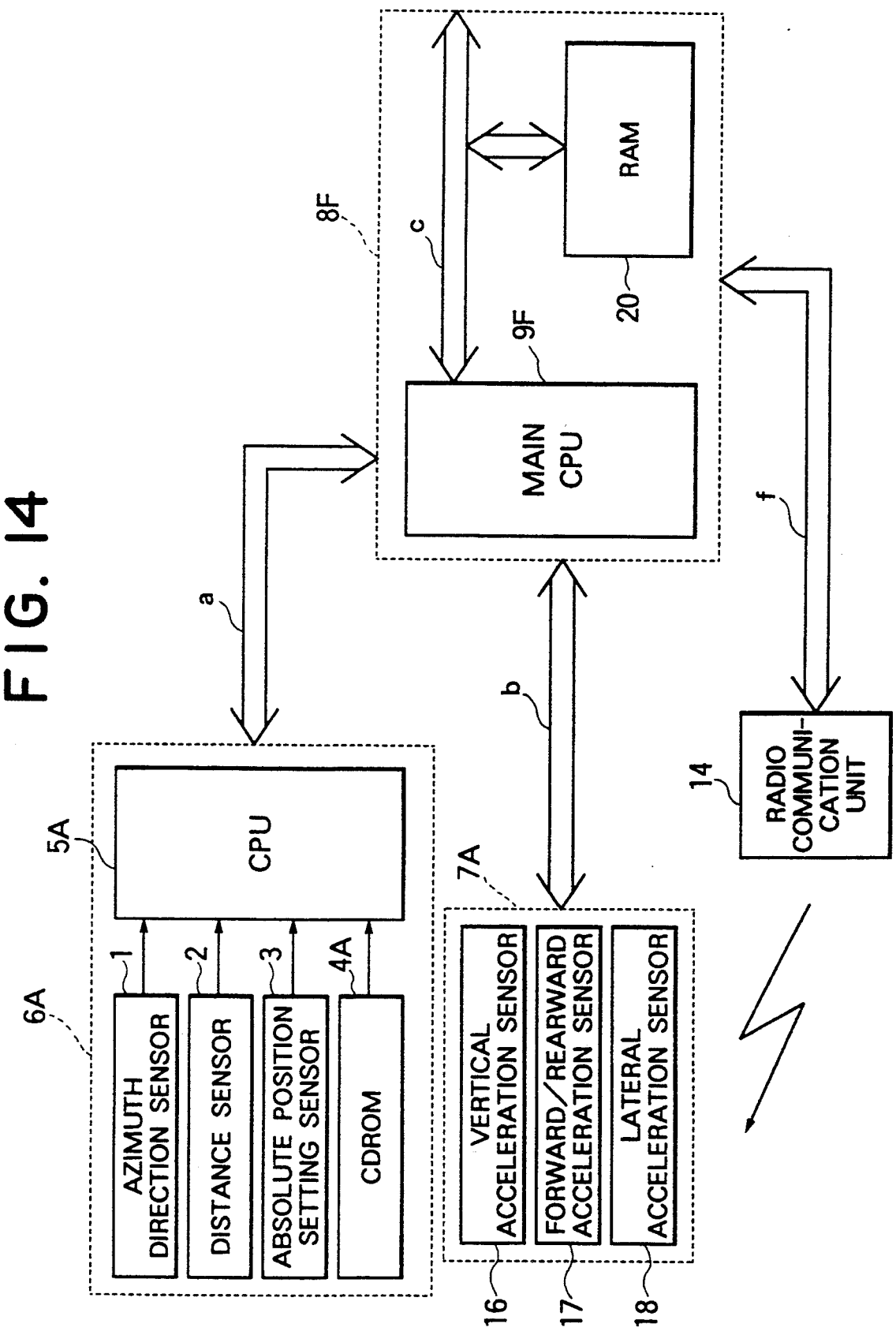
FIG. 14 is a block diagram showing a seventh embodiment of the invention.

FIG. 14 is a block diagram showing the general arrangement of a navigation system according to this embodiment. Referring to the figure, a location unit 6A, which may be the same as that described hereinbefore in conjunction with the fourth embodiment, is connected via an I/O bus a to a control unit 8F to which an acceleration sensor unit 7A and a communication unit 14, which may be the same as that in the fourth embodiment, are connected by way of I/O buses b and f, respectively. At this juncture, it should be noted that the acceleration sensor unit 7A is constituted by a three-dimensional array of acceleration sensors 16, 17 and 18 for sensing accelerations in the vertical direction, in the forward/rearward direction (i.e., longitudinally of the body of a car) and in the rightward/leftward direction (i.e., laterally or transversely of the car body), respectively.

The control unit 8F includes a main CPU 9F connected to a RAM 20 via a memory bus c. The RAM 20 may be of the same structure as that in the fourth embodiment.

In the case of the seventh embodiment of the invention, the location unit 6A constitutes the car location estimating means; the acceleration sensor 7, the main CPU 9F and the RAM 20 together constitute the car accident detecting means; and the communication unit 14 constitutes the radio communication means of the invention.

The operation of the car navigation system according to the seventh embodiment will be described with reference to FIG. 14.

The CPU 5A of the location unit 6A estimates the current car location on the basis of the signals output from the azimuth direction sensor 1, the distance sensor 2 and the absolute position setting sensor 3 by consulting road network data (road map data) stored in the CD-ROM 4A, to thereby transfer the car location data to the control unit 8F via the I/O bus a periodically at a predetermined time interval or each time the car has travelled a predetermined distance. Further, the CD-ROM 4A additionally stores emergency communication data such as telephone numbers of a police station or that of the JAR having jurisdiction over the district where the car is traveling, which data is read out by the CPU 5A and transferred to the control unit 8F, similar to the car location data.

In the acceleration sensor unit 7A, acceleration in three orthogonal directions are detected by the vertical acceleration sensor 16, the forward/rearward acceleration sensor 17 and the leftward/rightward or lateral acceleration sensor 18, respectively, wherein the three-dimensional acceleration data are supplied to the control unit 8F via the I/O bus b periodically at a predetermined time interval or upon every travel of a predetermined distance.

The main CPU 9F incorporated in the control unit 8F previously stores shock-ascribable acceleration change pattern data in the three orthogonal directions, which has previously been prepared empirically or experimentally.

Next, the operation of the control unit 8F will be described while referring to FIG. 15, which illustrates a processing sequence executed by the main CPU 9F.

Figure 15:
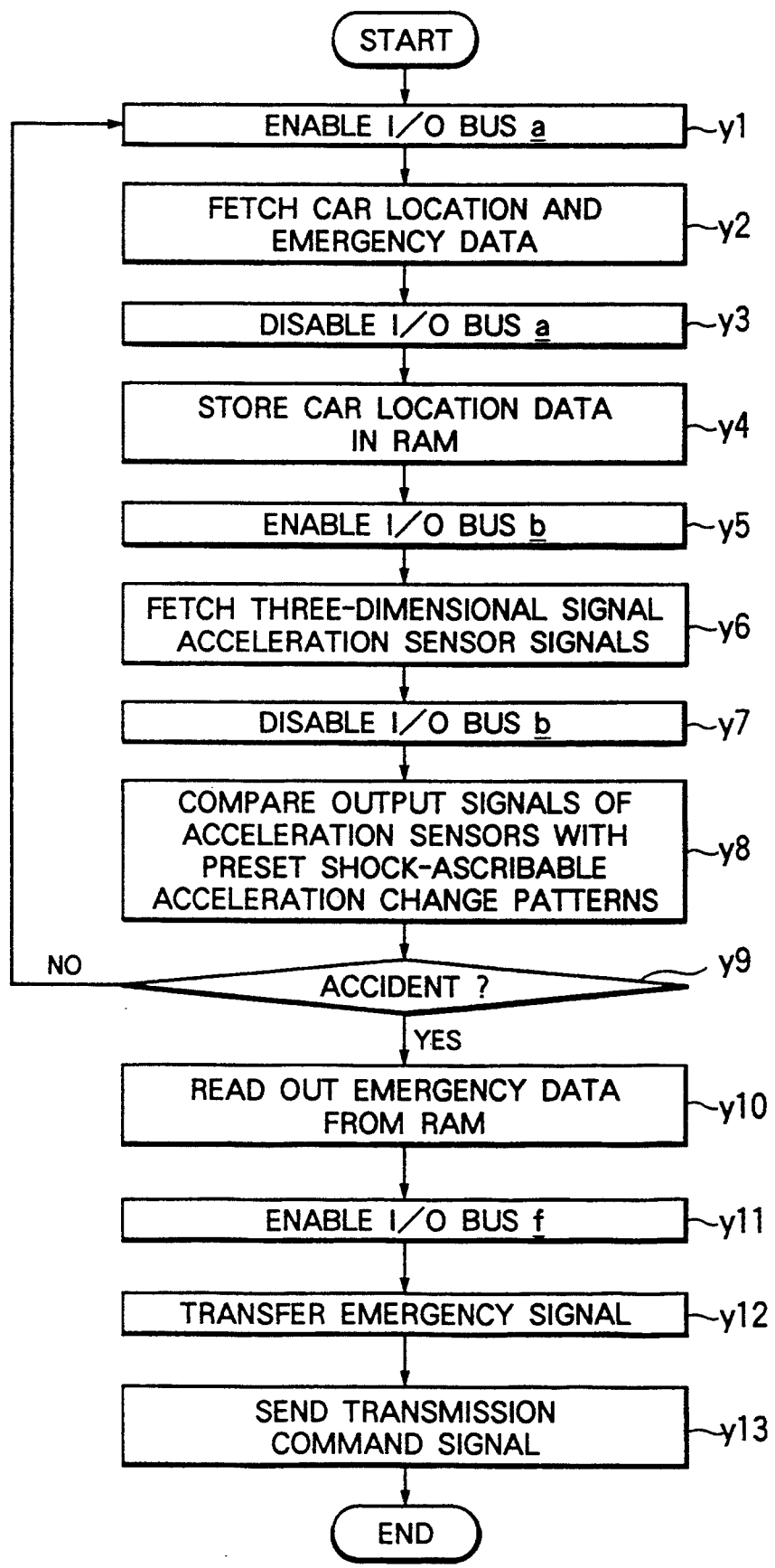
FIG. 15 is a flow chart illustrating the operation of the seventh embodiment of FIG. 14.

Referring to FIG. 15, the I/O bus a is reserved in a step y1, whereon the control unit 8F fetches car location data from the car location unit 6A in a step y2. In a next step y3, the I/O bus a is disabled.

In a step y4, the car location data and the emergency frequency data are loaded into the RAM 20 via the memory bus c. Thus, the car location data and the emergency frequency data stored in the RAM 20 are updated correspondingly.

In a step y5, the I/O bus b is reserved for allowing the control unit 8F to fetch three-dimensional acceleration signals from the sensor unit 7A (in a step y6). Thereafter, the I/O bus b is disabled in a step y7.

In a step y8, changes in the three-dimensional acceleration sensor signals are compared with the corresponding shock-ascribable three-dimensional acceleration change pattern data previously stored in the main CPU 9F.

In a step y9, if it is determined that the changes in the three-dimensional acceleration sensor signals are similar to the shock-ascribable three-dimensional acceleration change pattern, indicating the occurrence of an accident, the processing proceeds to a step y10 where the main CPU 9F inhibits any further transfer of the car location data and the emergency frequency data via the I/O bus a to thereby prevent the car location data and the emergency frequency data stored in the RAM 20 from being updated any more.

In a step y10, the emergency communication data is read out from the RAM 20. This data is read immediately before all the data in the RAM 20 disappear.

In steps y11 to y13, the emergency data read out from the RAM 20 are transferred to the radio communication unit 14 via the I/O bus f along with a transmission command signal. Thus, the radio communication unit 14 automatically sends out an emergency signal to a police station or a JAF office concerned.

If it is determined in the step y9 that the change in the acceleration sensor signal has no similarity to the shock-ascribable three-dimensional acceleration change pattern data as stored, indicating no occurrence of an accident, a return is performed to the step y1, whereon execution of the processing steps y1 to y9 described above is repeated.

As will be appreciated from the above description, in the navigation system according to the instant embodiment of the invention, the occurrence of an accident can be decided with high accuracy and reliability by virtue of such a feature that the changes in the three-dimensional acceleration sensor signals are compared with the stored data representing the shock-ascribable three-dimensional acceleration change pattern data. Further, an emergency message can automatically be sent out to a police station or a JAF office located in the district where the accident has occurred by using the car location data and the emergency communication data stored in the RAM 20.

EMBODIMENT 8

An eighth embodiment of the navigation system according to the second aspect of the invention will be described.

Figure 16:
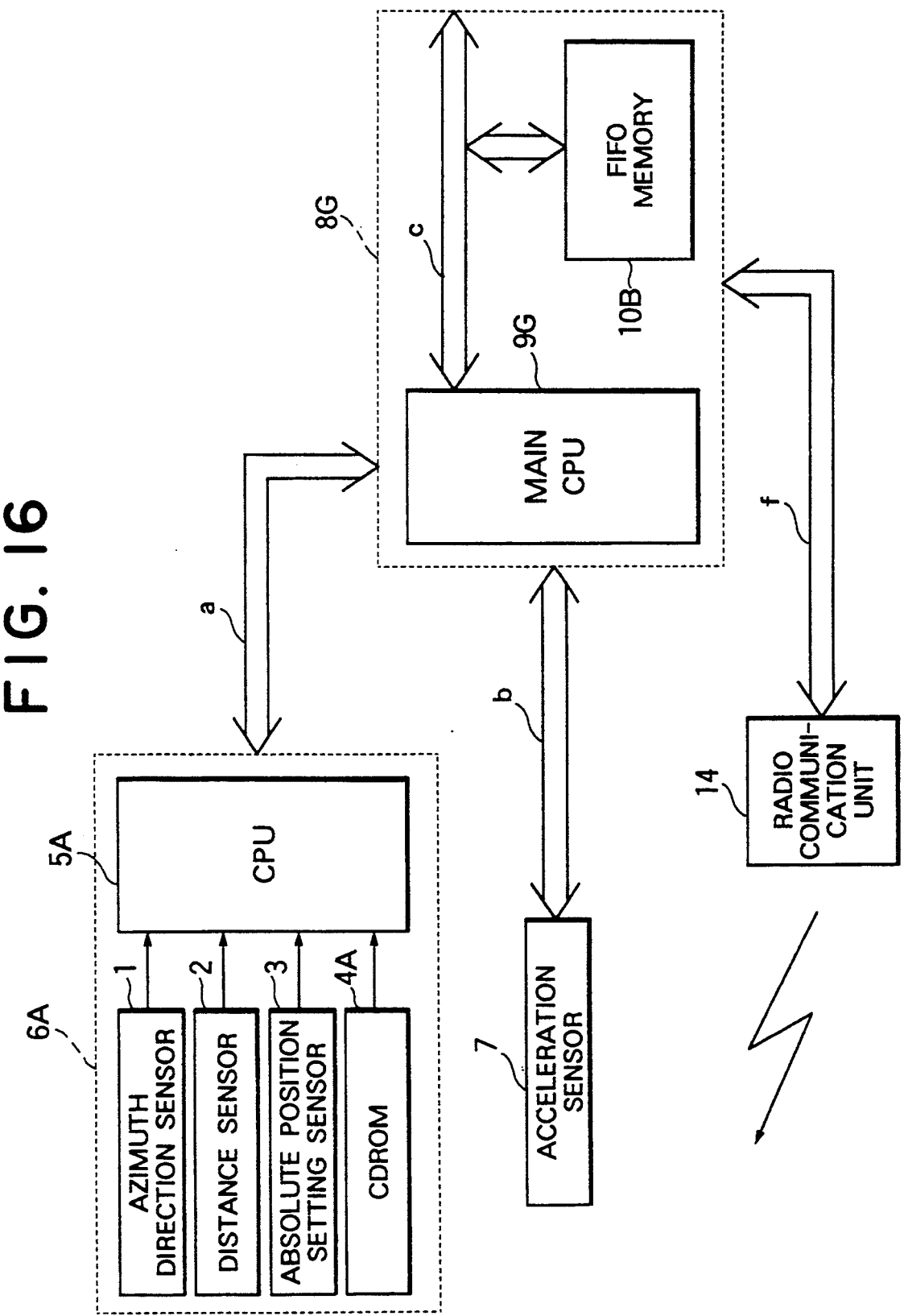
FIG. 16 is a block diagram showing an eighth embodiment of the invention.

FIG. 16 is a schematic block diagram showing the general arrangement of a navigation system according to the eighth embodiment of the invention. Referring to the figure, a location unit 6A, which may be of the same structures as that in the fourth embodiment, is connected via an I/O bus a to a control unit 8G to which an acceleration sensor 7, which is of the same structure as that in the first embodiment, and a radio communication unit 14, which may be of the same structures as that in the fourth embodiment, are connected by way of I/O buses b and f, respectively.

The control unit 8G includes a main CPU 9G and a FIFO memory 10B connected to the main CPU 9G via a memory bus c.

In this embodiment, the location unit 6A constitutes the car location estimating means; the acceleration sensor 7, the main CPU 9G and the FIFO memory 10B together constitute the car accident detecting means; and the radio communication unit 14 constitutes the communication means of the invention.

The operation of the car navigation system according to the eighth embodiment will be described with reference to FIG. 16.

In the location unit 6A, the CPU 5A estimates the current car location on the basis of the signals output from an azimuth direction sensor 1, a distance sensor 2 and an absolute location determining sensor 3 while consulting road network data (road map data) stored in the CD-ROM 4A, to thereby transfer the car location data to the control unit 8G via the I/O bus a periodically at a predetermined time interval or upon every travel of a predetermined distance. Furthermore, the CD-ROM 4A stores therein appropriate emergency communication data such as telephone numbers of police stations, JAP offices and similar organizations.

The acceleration sensor 7 detects an acceleration of the car in the forward/rearward direction and supplies the acceleration data to the control unit 8G via the I/O bus b periodically at a predetermined time interval or upon every travel of a predetermined distance.

The main CPU 9G incorporated in the control unit 8G is previously loaded with preset shock-ascribable acceleration change pattern data, as in the case of the preceding embodiments.

Next, the operation of the main CPU 9G will be described with reference to FIG. 17, which illustrates a processing sequence executed by the main CPU 9G.

Referring to FIG. 17, the I/O bus a is enabled in a step z1, whereon the main CPU 9G fetches the car location data and the emergency communication data from the location unit 6A in a step z2. In a step z3, the I/O bus a is disabled.

In a step z4, the car location data and the emergency communication data are loaded into the FIFO memory 10B via the memory bus c. In this manner, the car location data and the emergency communication data stored in the FIFO memory 10B are updated constantly.

In a step z5, the I/O bus b is enabled for allowing the main CPU 9G to fetch an acceleration signal from the acceleration sensor 7 in a step z6. Thereafter, the I/O bus b is disabled in step z7.

In step z8, a change in the acceleration sensor signal is compared with the preloaded shock-ascribable acceleration change pattern data.

In a step z9, if it is determined that the change in the acceleration sensor signal is similar to the preloaded change pattern, indicating the occurrence of an accident, the processing proceeds to a step z10 where the main CPU 9G stops to fetch the car location data and the emergency communication data from the CD-ROM 4A via the I/O bus a to thereby inhibit these data from being stored in the FIFO memory 10B. Thus, from this time point, the car location data and the emergency communication data stored in the FIFO memory 10B are not updated.

In a step z10, a memory power supply for the FIFO memory 10B is changed over to a back-up memory power supply to hold the car location data and the emergency communication data as stored in the FIFO memory 10B.

In steps z11 to z14, the latest emergency communication data is read out from the FIFO memory 10B and the I/O bus f is enabled to transfer the emergency communication data as read out to the radio communication unit 14 along with a transmission command signal. Thus, the communication unit 14 can automatically send out the message or information about the accident to a police station or a JAF office or a third party located in the vicinity.

If it is determined in a step z15 that the communication unit 14 has sent out the emergency message, then the processing proceeds to a step z16 where the main CPU 9G issues a data transfer request signal to the FIFO memory 10B.

In a step z17, decision is made as to whether a transfer admission signal is issued by the FIFO memory 10B. If so (YES), then a step z18 is executed.

In the step z18, the main CPU 9G transfers the car location data, i.e., data of the track or road history followed or travelled by the motor car up to the time of occurrence of the accident to the communication unit 14.

In a step z19, the communication unit 14 sends out an end or termination signal, and the I/O bus f is disabled in a step z20, thus completing the operation of the car navigation system.

In contrast, if it is determined in the step z9 that the change in the acceleration sensor signal bears no similarity to the shock-ascribable acceleration change pattern, indicating no occurrence of an accident, a return is carried out to the step z1, whereon the execution of the processing steps z1 to z9 described above is repeated.

If it is determined in the step z15 that the communication unit 14 has sent out no transmission command signal, the processing proceeds to the step z14.

If it is determined the step z17 that no transfer admission signal has been sent out from the FIFO memory 10B (i.e., the answer is "NO"), the processing proceeds to the step 16.

According to the eighth embodiment of the navigation system, not only information about the location at which an accident has taken place but also information about the track or road history followed or travelled by the car up to the time of occurrence of the accident can be informed to a police station or a JAF office located within a communication covering range by utilizing the emergency communication data and the current car location data stored in the FIFO memory 10B at the time of occurrence of the accident.

EMBODIMENT 9

Figure 18:
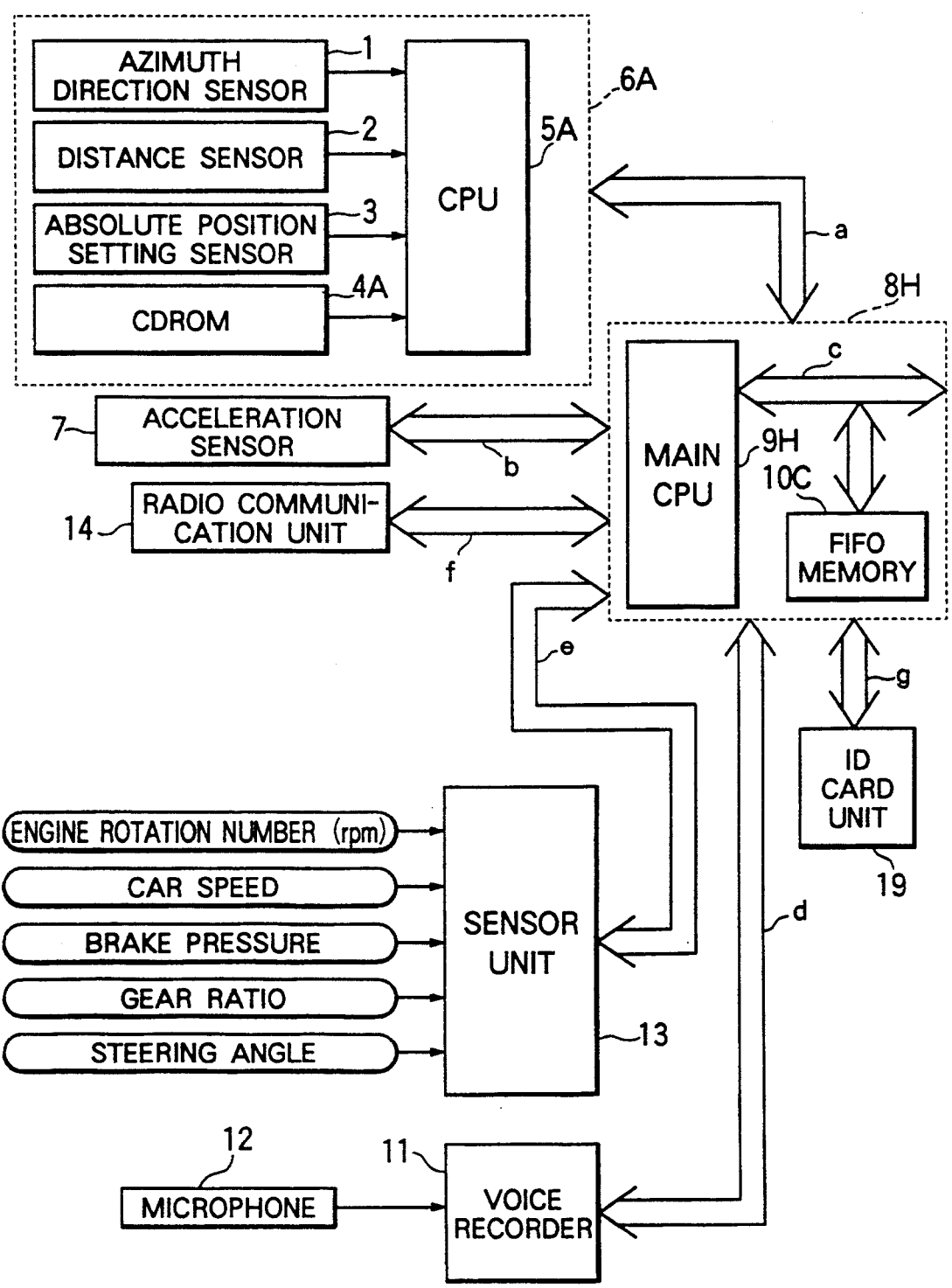
FIG. 18 is a block diagram showing a ninth embodiment of the invention.

Finally, a ninth embodiment of the invention will be described while referring to FIG. 18, which illustrates the general structure of a navigation system according to this embodiment. Referring to the figure, a location unit 6A and a communication unit 14, which are of the same structures and serve for the same functions as those described hereinbefore in conjunction with the fourth embodiment, are connected to a control unit 8H via I/O buses a and f, respectively. An acceleration sensor 7, which may be same as that in the first embodiment, is also connected to the control unit 8H via an I/O bus b. In addition, a voice recorder 11 including a microphone 12 is connected to the control unit 8H via an I/O bus d, as described previously in conjunction with the second embodiment. A sensor unit 13, which may be the same as that in the third embodiment, is connected to the control unit 8H via an I/O bus e. Finally, an identification card or ID card unit 19 is connected to the control unit 8H via an I/O bus g.

The control unit 8H includes a main CPU 9H and a FIFO memory 10C connected to the main CPU 9H via a memory bus c.

In the case of the ninth embodiment of the invention, the location unit 6A constitutes the car location estimating means; the acceleration sensor 7 and the main CPU 9H together constitute the accident detecting means; the FIFO memory 10C, the voice recorder 11 having the microphone 12, the sensor unit 13 and the ID card unit 19 together cooperate to constitute the car information storage means; and the radio communication unit 14 constitutes the communication means of the invention.

The operation of the navigation system according to the ninth embodiment will be described with reference to FIG. 18.

In the location unit 6A, the CPU 5A estimates the current car location on the basis of the signals output from an azimuth direction sensor 1, a distance sensor 2 and an absolute location setting sensor 3 while consulting road network data (road map data) stored in the CD-ROM 4A, to thereby transfer the car location data together with emergency communication data to the control unit 8H via the I/O bus a periodically at a predetermined time interval or upon every travel of a predetermined distance.

On the other hand, the acceleration sensor 7 detects an acceleration of the car, for example, in the forward or rearward direction and supplies acceleration data to the control unit 8H via the I/O bus b periodically at a predetermined time interval or upon every travel of a predetermined distance.

Further, voices generated internally of the car is picked up by the microphone 12 and recorded by the voice recorder 11 which may be implemented as an endless magnetic tape recorder.

The sensor unit 13 serves for detecting an engine rotational number (i.e., rpm), a car speed, a brake pressure, a transmission gear ratio and a steering angle to supply corresponding signals (i.e., car operation data signals) to the control unit 8H via the I/O bus e periodically at a predetermined time interval or upon every travel of a predetermined distance.

The ID card unit 19 serves for storing personal information such as the address, name, distinction of sex, experience in driving a car and others of the driver as well as the name, address and other information of an accompanying passenger(s), if any.

The main CPU 9H of the control unit 8H is previously loaded with shock-ascribable acceleration change pattern data which is previously prepared empirically.

Next, the operation of the control unit 8H will be described below with reference to FIG. 19, which illustrates processing steps executed by the main CPU 9H.

Figure 19:
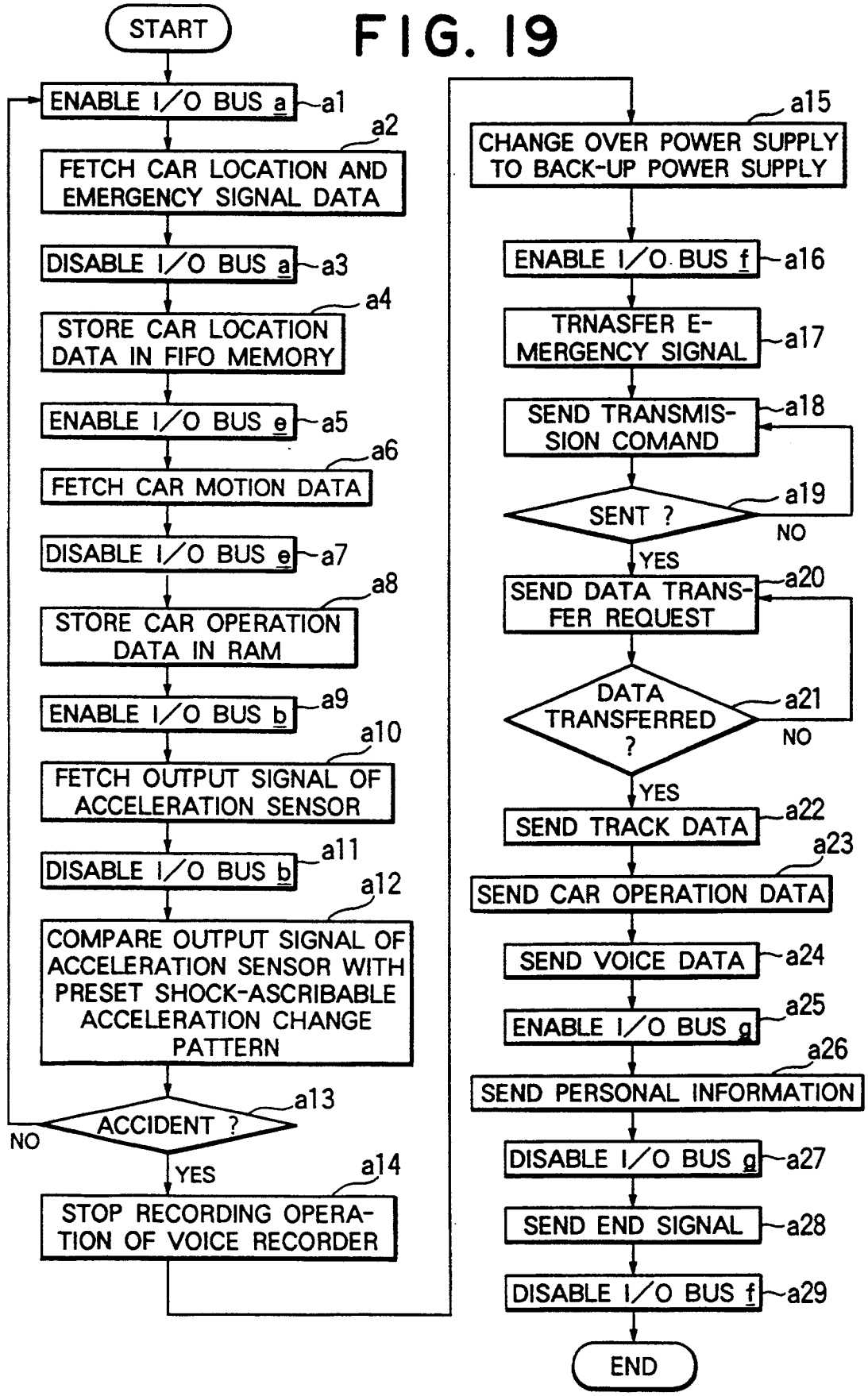
FIG. 19 is flow chart illustrating the operation of the ninth embodiment of FIG. 18.

Referring to FIG. 19, the I/O bus a is enabled in a step a1. In a step a2, the CPU 9H fetches car location data and emergency communication data from the car location unit 6. Thereafter, in a step a3, the I/O bus a is disabled.

In a step a4, the current car location data and the emergency communication data are loaded into the FIFO memory 10C via the memory bus c. Thus, the car location data and the emergency communication data stored in the FIFO memory 10C are updated to the respective latest values.

In a step a5, the I/O bus e is enabled, and in step a6, the main CPU 9H fetches the car operation data from the sensor unit 13. Thereafter, in a step a7, the I/O bus e is disabled.

In a step a8, the car operation data is successively loaded via a memory bus c into the FIFO memory 10C which is thus updated.

In a step a9, the I/O bus b is reserved for allowing the main CPU 9H to fetch an acceleration signal from the acceleration sensor 7 (in a step a10). Thereafter, the I/O bus b is disabled in a step a11.

In a step a12, a change in the acceleration sensor signal is compared with the preloaded shock-ascribable acceleration change pattern by the main CPU 9H.

If it is determined in a step a13 that the change in the acceleration sensor signal is similar to the preloaded acceleration change pattern, indicating the occurrence of an accident, the processing proceeds to a step a14 where the voice recorder 11 is stopped. At this time, the main CPU 9A receives no more car location data and the emergency communication data via the I/O bus a and inhibits the FIFO memory 10C from accepting the car location data and the emergency communication data.

In a step a15, the power supply for the FIFO memory 10C is changed over to a back-up power supply in order to hold the car location data, the emergency communication data and the car operation data in the FIFO memory 10C.

In steps a16 to a18, the main CPU 9H fetches the latest emergency communication data from the FIFO memory 10C, enables the I/O bus f, and transfers via the I/O bus f the emergency communication data to the communication unit 14 together with a transmission command signal. Thus, the communication unit 14 automatically sends out an emergency or accident message to a nearby police station or a JAF office.

In a step a19, decision is made as to whether or not the communication unit 14 has sent out the information. If so (YES), the processing proceeds to a step a20 where the main CPU 9H sends a data transfer request signal to the FIFO memory 10C.

In a step a21, decision is made as to whether or not the FIFO memory 10C has issued a transfer enable signal. If so (YES), the processing proceeds to a step a22.

In the step a22, the car location data, i.e., the data of the track followed by the car up to the time of occurrence of the accident is transferred to the communication unit 14 via the I/O bus f.

In a step a23, the car operation data is transferred from the FIFO memory 10C to the communication unit 14 via the I/O bus f.

In a step a24, voice data recorded in the voice recorder 11 is reproduced and transferred to the communication unit 14 via the I/O bus f.

In a step a25, the I/O bus g is enabled. In a step 26, personal information is fetched from the ID card unit 19 by the control unit 8H and transferred to the communication unit 14 via the I/O bus f, whereupon the I/O bus g becomes disabled.

In the step 23, an end or termination signal is sent out to the communication unit 14, and the I/O bus f is then disabled, thus completing the operation.

If it is determined in the step a13 that the change in the acceleration sensor signal bears no similarity to the previously stored shock-ascribable acceleration change pattern, indicating no occurrence of an accident, the step a1 is returned, and the operation described above is repeated.

If it is determined in the step a19 that the communication unit 14 has sent out no message (i.e., the answer in this decision step is "NO"), a return is carried out to the step a14.

Further, if it is determined in the step a21 that the transfer admission signal is not issued from the FIFO memory 10C, a return is performed to the step a16.

As will be understood, according to the ninth embodiment of the invention, it is possible to send, at the time of occurrence of an accident, information about the location which the accident has taken place, the track followed by the car, the running behavior thereof and the intra-car situation up to the time of occurrence of the accident as well as personal information about the driver and the accompanying passenger(s), if any, to a police station or a JAF office having jurisdiction, on the basis of the car location information, the emergency communication data and the car operation data stored in the FIFO memory 10C, the voice data recorded by the voice recorder 11 and the personal information stored in the ID card unit 19. Further, these data or records can be maintained available even after the occurrence of the accident.

Although it has been described that personal information has been stored in the ID card unit 19, it should be understood that other information such as car number information, car inspection information or the like may additionally be stored in the ID card unit 19. Further, a car information dedicated storage unit may additionally be included.

As will now be appreciated from the above description, a navigation system according to the invention includes at least one of the following components which comprise car location estimating means for estimating the location at which a car of concern is traveling, accident detecting means for detecting the occurrence of an accident, storage means for storing the information supplied from the car location estimating means and the information to be used for analyzing the accident, the storage means being so implemented as to stop storing the information when an accident is detected by the car accident detecting means, and communication means for sending out information generated by the car location estimating means together with information for analyzing the accident. The system of the invention provides the following advantages.

The information about the location at which a car accident has taken place can facilitate identification and analysis of the accident.

Stored information about the track or road history which is travelled by the car can facilitate an analysis of the accident.

Recorded voice information generated in the car can be utilized for analyzing the situation which prevailed within the car before it suffered from the accident, which is also very helpful for the accident analysis.

Storage of the information about running or traveling conditions of the car before the occurrence of the accident can also facilitate the accident analysis.

Storage of the personal information about the driver and the accompanying passenger(s), if any, makes it easy to message the accident to relevant parties.

By sending out the car accident location information by the radio communication means, the location or place where the accident happened can easily be discovered.

Owing to the information about the track followed by the car, the running condition of the car can easily be determined, which facilitates to analyze and locate the cause of the accident with enhanced accuracy and reliability.

Moreover, the voice information recorded in the car provides information concerning the situation within the car leading to the accident, which allows the accident analysis to be made in more detail.

By sending out the traveling conditions of a car through the radio communication means, a concerned party can know the travelling condition leading to the accident, whereby analysis thereof can be performed in detail.

Owing to the personal information about the driver and the accompanying passenger(s), the names and histories of the driver as well as the accompanying passenger(s) are informed to a relevant organization or agency, whereby not only rescue of the persons involved in the accident but also communication to the relevant parties are much facilitated.

While the invention has been described in terms of its preferred embodiments, it should be understood that numerous modifications may be made thereto without departing from the spirit and scope of the invention as defined in the appended claims. It is intended that all such modifications fall within the scope of the claims.

What is claimed is:

1. A car navigation system, comprising:
    car location estimating means for estimating a traveling location of a car based in part on road network maps and generating car information;
    car accident detecting means for detecting occurrence of an accident involving the car;
    storage means for successively storing and updating the car information from the car location estimating means, the car information including car location based on road network maps and emergency telephone numbers and emergency radio frequencies based on the car location for communicating the accident to nearby emergency rescue stations, said storage means being operable to stop updating the car information when the car accident detecting means detects the occurrence of the accident; and
    communication means for transmitting the car information and the emergency numbers and frequencies obtained from the car location estimating means and the updated car information from said storage means via an optimal transmission when said car accident detecting means detects the occurrence of the accident.

2. A car navigation system according to claim 1, wherein said storage means stores information concerning a location where the accident has taken place.

3. A car navigation system according to claim 1, wherein said storage means stores information concerning a track followed by the car.

4. A car navigation system according to claim 1, wherein said storage means stores voice information generated in the car.

5. A car navigation system according to claim 1, wherein said storage means stores information concerning traveling conditions of the car.

6. A car navigation system according to claim 1, wherein said storage means stored personal information about a driver of the car and any accompanying passengers.

7. A car navigation system according to claim 1, wherein the optimal transmission is via a telephone number of a nearest rescue station which is selected from the updated car information stored in said storage means based on the detected location of the accident.

8. A car navigation system according to claim 1, wherein the optimal transmission is via a specific radio frequency which is selected from the updated car information stored in said storage means based on the detected location of the accident.

* * * * *